(12) United States Patent
Lord et al.

(10) Patent No.: US 11,622,270 B2
(45) Date of Patent: Apr. 4, 2023

(54) METHOD AND APPARATUS FOR MILLIMETER-WAVE PHYSICAL LAYER AUTHENTICATION

(71) Applicant: The United States of America, as represented by the Secretary of the Navy, Arlington, VA (US)

(72) Inventors: Scott Frederick Lord, Chula Vista, CA (US); John David-Dickson Roth, Del Rey Oaks, CA (US); Murali Tummala, Monterey, CA (US); John Colin McEachen, Carmel, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 126 days.

(21) Appl. No.: 17/325,796

(22) Filed: May 20, 2021

(65) Prior Publication Data

US 2021/0368338 A1 Nov. 25, 2021

Related U.S. Application Data

(60) Provisional application No. 63/027,863, filed on May 20, 2020.

(51) Int. Cl.
*H04W 12/06* (2021.01)
*H04W 72/12* (2009.01)
*H04W 64/00* (2009.01)

(52) U.S. Cl.
CPC .......... *H04W 12/06* (2013.01); *H04W 64/00* (2013.01); *H04W 72/12* (2013.01)

(58) Field of Classification Search
CPC ............ H04W 12/06; H04W 72/1268; H04W 64/006; H04W 64/00; H04W 40/08; H04W 56/001; H04W 40/20; G01S 5/06
See application file for complete search history.

(56) References Cited

U.S. PATENT DOCUMENTS

| | | | |
|---|---|---|---|
| 10,932,221 B2* | 2/2021 | Grossmann | G01S 5/0284 |
| 11,158,939 B2* | 10/2021 | Yilmaz | H01Q 1/24 |
| 11,303,018 B2* | 4/2022 | Yilmaz | H01Q 3/2605 |
| 2019/0373575 A1* | 12/2019 | Kurras | G01S 5/10 |
| 2020/0022607 A1* | 1/2020 | Pratt | A61B 5/6891 |
| 2020/0112094 A1* | 4/2020 | Yilmaz | H01Q 1/1257 |
| 2020/0267681 A1* | 8/2020 | Ferrari | H04B 7/02 |
| 2020/0403664 A1* | 12/2020 | Walk | H04B 7/0452 |
| 2021/0235359 A1* | 7/2021 | Caporal Del Barrio | H04L 25/0204 |
| 2022/0022056 A1* | 1/2022 | Park | G01S 13/003 |
| 2022/0052728 A1* | 2/2022 | Walk | H04B 7/0452 |

(Continued)

*Primary Examiner* — Khawar Iqbal
(74) *Attorney, Agent, or Firm* — Naval Postgraduate School; Scott Bell

(57) ABSTRACT

Physical-layer authentication based on the channel response over a wireless medium are described. In a first authentication scheme, a count is kept of how many significant multipath taps remain empty or occupied from one channel estimate to the next for authentication purposes. In a second authentication scheme, which does not require an alternative means of initial authentication, the presence of a multipath component based on a reported position of a transmitter and the side knowledge of planar reflectors in the environment may be leveraged for authentication purposes.

18 Claims, 8 Drawing Sheets

(56) References Cited

U.S. PATENT DOCUMENTS

2022/0086694 A1\* 3/2022 Kons ................... H04W 72/044
2022/0349981 A1\* 11/2022 Akkarakaran ............ G01S 1/20

\* cited by examiner

METHOD AND APPARATUS FOR MILLIMETER-WAVE PHYSICAL LAYER AUTHENTICATION

CROSS-REFERENCE TO RELATED APPLICATIONS

This patent application is a non-provisional of and claims the benefit of U.S. Provisional application 63/027,863, filed May 20, 2020 which is hereby incorporated by reference in its entirety.

BACKGROUND OF THE INVENTION

1. Field of the Invention

The present invention relates generally to millimeter-wave physical layer authentication that leverages nearby planar reflectors and a location of a transmitter to predict features in the channel response.

2. Description of the Related Art

As devices become more capable and connected, they inherently incur a larger surface for potential cyber vulnerabilities. By being more capable, devices tend to be more valuable to a nefarious actor, increasing an adversary's motivation to discover and exploit a cyber vulnerability. Being more connected creates more points of entry, which might be exploited by a nefarious actor. Despite the increased risk of cyber vulnerabilities, most users desire more capable and better connected devices.

In cybersecurity, a common approach is to group cyber vulnerabilities according to the Open Systems Interconnected (OSI) Model, which considers communication or computer systems as a set of layers starting at the top with the application layer and continuing down through seven layers to the bottom layer, the physical layer.

In general, authentication aims to verify the identity of an entity that sent a message. An example construct typically employs three entities, for example, Alice, Bob and Eve. Alice sends a message to Bob, and Bob has to determine if the message is actually from Alice. Eve is an agent who attempts to deceive Bob by masquerading as Alice. The more successful Bob is at identifying legitimate messages from Alice as well as inauthentic messages from Eve, the better the authentication scheme.

Current authentication methods include a cryptographic technique known as a digital signature, which provides the following: a means to verify Alice (authentication), a means to prevent Alice from denying the message was sent (non-repudiation), and a means to ensure Alice's message was not altered (integrity). However, challenges exist with cryptographic methods. For example, cryptographic techniques typically operate on data at levels above the physical layer in the OSI model. Thus, if an attacker is able to obtain an unauthorized security key, the system cannot easily detect the security violation when the physical layer attributes are disregarded.

Physical layer authentication is the process of leveraging data available in the physical layer to confirm or dispute the claimed identity in a received transmission. An example physical layer authentication scheme is radio frequency-fingerprint physical layer authentication. The drawbacks of this scheme includes scalability, complexity and costly measurement equipment. This scheme is difficult to scale as each new device must have its fingerprint be captured, collected and stored; and the fingerprint may vary over the device's lifetime, making it complicated to quantify this variation. Moreover, there is small variation from device to device, thus the accuracy required to differentiate devices may require costly measurement equipment. Another physical layer authentication method is secret key generation. Secret key generation leverages transmitter and channel phenomena by generating a cryptographic key based on measurements of the phenomena. Secret key generation is limited by the ability of Alice and Bob to reach an identical measure of the reciprocal channel response and the variation in likely reciprocal channel responses (more variation in responses makes it harder for Eve to guess). Also, this general approach requires some other means to authenticate Alice at the beginning of an exchange. If Eve can impersonate Alice at the beginning of the exchange, then Eve and Bob will establish a secret key given that Eve knows the protocol for key generation.

SUMMARY OF THE INVENTION

Embodiments described herein provide two physical layer authentication schemes that are resilient to millimeter-wave channel phenomena. The first authentication scheme addresses the challenges of channel sparsity, and the second authentication scheme predicts the presence of a multipath component based on a reported position of a transmitter and environmental information without requiring an alternative means of initial authentication.

A method of physical layer authentication that includes receiving a transmission by a transmitter at a receiver over a sparse wireless channel, the transmitter being located in a region that comprises a mapped planar reflector having a reflecting plane suitable for generating a specular reflection. The method further includes estimating a time-domain channel response measurement for the transmission. Based on the channel response measurement, the method further includes determining whether a non-zero tap is detected within an anticipated delay interval of an anticipated relative time delay, the anticipated relative time delay being based on a position of the transmitter and a position of the mapped planar reflector. If a non-zero tap is detected within the interval, the transmission is declared as authentic. If the non-zero tap is detected outside of the interval, then the transmission is declared inauthentic.

A system for physical layer authentication is also provided. The system includes a receiving subsystem configured to receive a transmission by a transmitter over a sparse wireless channel, the transmitter being in a region that comprises a mapped planar reflector having a reflecting plane suitable for generating a specular reflection. The system further includes a channel estimator configured to estimate a time-domain channel response measurement for the transmission. The system also includes an authenticator configured to determine whether a non-zero tap is detected within an anticipated delay interval of an anticipated relative time delay, the anticipated relative time delay being based on a position of the transmitter and a position of the mapped planar reflector. The authenticator is also configured to declare the transmission is authentic if a non-zero tap is detected within the interval, or to declare the transmission as inauthentic if the non-zero tap is not detected within the interval.

Another method of physical layer authentication is also provided. The method includes receiving a first transmission from a transmitter via a millimeter-wave channel. The method further includes determining a channel response measurement in time domain, the measurement comprising a delay line with multiple taps having tap power levels represented as discrete impulses at different delay intervals. The channel response measurement is then associated to the transmitter. For the associated channel response measurement, a state of occupied or empty is assigned to each of the multiple delay intervals. The method further includes receiving a second transmission from the transmitter and checking the state of each of the multiple delay intervals. A first number of delay intervals that remain occupied and a second number of delay intervals that remain empty is determined. The second transmission is determined to be authentic when a sum of the first number and the second number exceeds a predetermined threshold, and inauthentic when the sum is below the predetermined threshold.

Embodiments in accordance with the invention are best understood by reference to the following detailed description when read in conjunction with the accompanying drawings.

Figure 1:
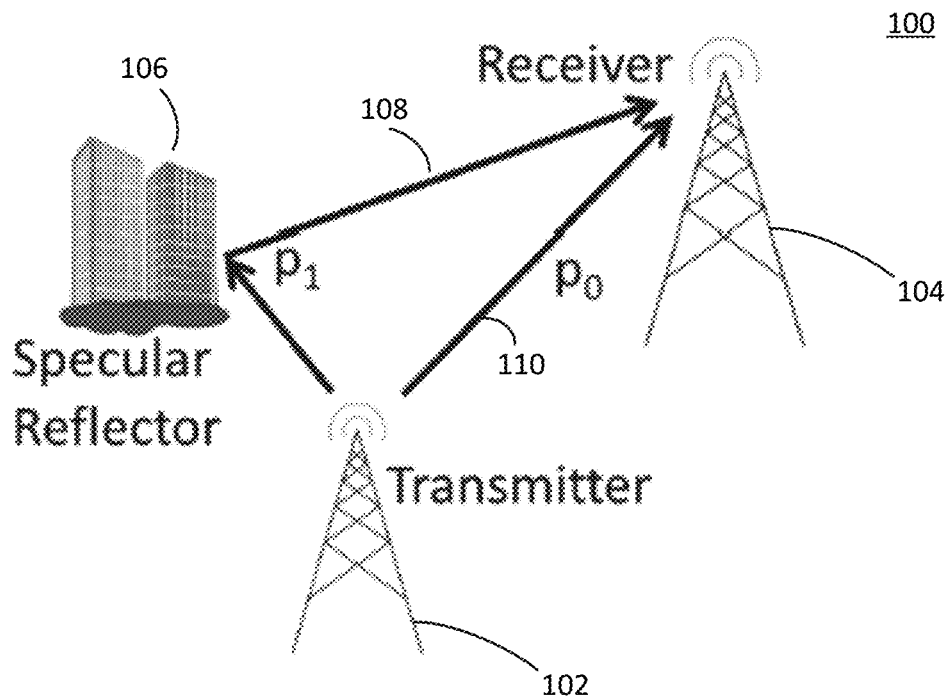
FIG. 1 illustrates an example multipath environment with a building acting as a specular reflector.

Embodiments in accordance with the invention are further described herein with reference to the drawings.

DETAILED DESCRIPTION OF THE INVENTION

Overview

Cybersecurity covers an immense amount of topics, even for a single layer in the OR model, such as the physical layer. The physical layer is the first layer through which data enters a system, and thus if a vulnerability can be mitigated in the physical layer, then the subsequent layers are also protected, increasing the overall value of such a mitigation. Also, the physical layer, as the name implies, interacts with the physical world. This causes data in the physical layer to be connected to environment dependent phenomena. For example, a typical physical layer data parameter is received signal strength (RSS), which is how much energy is collected by a receiving system, and it depends on environmental phenomena, such as path loss and transmitted power. Because physical layer data is dependent on the physical environment, physical security efforts, such as erecting walls and prohibiting personnel access, can be leveraged to directly affect physical layer data. This tends to amplify the value of security features that act at the physical layer because they enable a security force to take advantage of the multitude of security mechanisms that are often already installed to protect a physical location.

Embodiments described herein focus on physical layer authentication based on the channel response over a wireless medium. In particular, in a first authentication scheme, which requires an alternative means of initial authentication, a count is kept of how many significant multipath taps remain empty or occupied from one channel estimate to the next for authentication purposes. The sparsity of a typical millimeter wave channel yields erratic tap magnitude behavior from one channel estimate to the next. By evaluating how many multi-path taps remain or appear from one channel estimate to the next, a consistent decision statistic can be established, which is principally independent of the erratic changes in tap magnitude. Additionally, because the channel is sparse, there are fewer taps in the channel response. So, a tap appearing or disappearing has a much more amplified impact on the overall decision statistic used to declare if the new channel response estimate belongs to the same transmitter.

In a second authentication scheme, which does not require an alternative means of initial authentication, the presence of a multipath component based on a reported position of a transmitter and the side knowledge of planar reflectors in the environment may be leveraged for authentication purposes.

The premise of physical layer authentication depends on two fundamental aspects, differentiation and continuity. To use the same example construct involving Alice, Bob and Eve, for differentiation the first information regarding the transmission from Alice to Bob is different than the second information regarding the transmission from Eve to Bob at a given time. For continuity, the first information is some way related to other known information such as previous transmission information between Alice and Bob, the position of Alice, or how much time passed since the last transmission from Alice. Without differentiation, it is not feasible to tell Alice from Eve, and without continuity it is not feasible to tell if a new transmission is still from Alice vice some random stranger.

To meet the differentiation and continuity aspects of authenticating Alice, a variety of phenomena may be used based on the source, transmitter, receiver or the environment. Transmitter-derived phenomena enable differentiation of Alice from Eve based on the unique physical behavior of each device due to variations in the device state. Transmitter-derived phenomena include original manufacturing process, performed maintenance, battery life, and temperature. Environment-derived phenomena enable differentiation based on the unique channel response of each location from which a transmission can originate. Environmental-derived phenomena include multipath delays, path loss, Doppler shifts, and angle of arrival. Essentially, transmitter-derived phenomena identify the device transmitting, and the environment-derived phenomena identify the location of the transmission relative to the environment. Regarding receiver-induced phenomena, the effects are usually the same whether the received transmission is from an authentic or inauthentic entity, thus providing no capacity to differentiate the two. However, receiver-induced phenomena can shape which transmitter-derived and environment-derived phenomena provide better authentication features of Alice. Authentication schemes based on transmitter-induced phenomena will be referred to herein as radio frequency (RF)-fingerprint authentication, whereas authentication schemes based on environment-derived phenomena will be referred to herein as channel-based authentication.

If Bob has adequate a priori information regarding the nearby environment, and Bob is provided location information regarding Alice, then Bob can verify whether features in the channel response match those expected for the claimed position. Such an arrangement challenges Eve to know the expected channel response features for a claimed position and to recreate such features synthetically.

Regarding the ability to differentiate Alice from Eve, it is known that the correlation of a received signal envelop will rapidly diminish when Alice and Eve are physically separated by a distance of at least half the carrier wavelength. So, at a carrier frequency of 5 GHz, Alice and Eve only need to be about 3 centimeters apart to have different signal envelopes. This differentiation occurs because in multipath transmission, each multipath component arriving at the receiver travels a unique path length and thus has a unique phase relative to the other multipath components. As such, the multipath components constructively and destructively interfere dependent on the path length each travels. Those path lengths traveled are dependent on the position of Alice. If Eve is not close to Alice, then a different net interference result is anticipated, and Alice may be differentiated from Eve. Regarding continuity, channel features that vary slowly from one data symbol to the next, such as multipath delay and angle of arrival, may be used to verify Alice. This continuity occurs principally due to the fact that Alice and Bob exist in an environment where many physical objects, such as buildings and roads, do not change appreciably over the time scale between channel environments. If Alice's position and Bob's position do not change quickly relative to the environment, then some channel response features do not change quickly. The core of channel-based authentication is determining which features in the channel response may be measured by Bob that will provide adequate differentiation between Alice and Eve while also providing adequate continuity to authenticate Alice.

Channel Model

The term channel refers to the medium between a transmitter and a receiver. The characteristics of a wireless signal change as the signal travels from the transmitter to the receiver. These characteristics depend on the distance between the transmitter and the receiver, the path(s) taken by the signal, and the environment (e.g., buildings, ground, and objects) around the path. A channel response or power profile of the received signal may be obtained from the transmitted signal using a model of the channel. The channel model may be utilized to assess which features of the channel response support the goal of authentication. The intent is to connect the mathematical representation used to describe the channel with the physical world such that the parameters in the math equations have relevant meaning.

The channel model is motivated by the concept of scatterers in the environment creating multiple paths that the transmission can traverse and still have significant energy upon reaching the receiver. Such an environment is shown in FIG. 1. FIG. 1 illustrates an example multipath environment with a building acting as a specular reflector. As shown in FIG. 1, environment 100 includes transmitter 102, receiver 104 and building 106 acting as a specular reflector. A transmission from transmitter 102 has two paths to traverse: a direct line-of-sight (LOS) path 110, p=0, and an indirect non-line-of-sight (NLOS) path 108, p=1, bouncing off building 106. Building 106 is only one example of a specular reflector. A specular reflector or planar reflector may generally be any structure that is large and stationary (e.g., the ground, a wall, a building façade) and the path for reflections from such structure is expected to be unblocked.

The following channel model defines the received signal as a sum of P multipath components, each with its own time delay $\tau_p$ and complex gain $\beta_p$ such that the channel impulse response (CIR) is:

$$h(t,\tau) = \Sigma_{p=0}^{P-1} \beta_p(t) \delta(\tau - \tau_p) \qquad (1)$$

where p is the index for each multipath component, t is the global time to indicate the complex gain $\beta_p(t)$ changes from one measurement of the channel to the next, $\tau$ is the relative time to describe the relative delay of each multipath component $\tau_p$, $\Sigma\{\cdot\}$ is the summation operator, and $\delta$ is the Dirac Delta function. The complex gain of each multipath component $\beta_p(t)$ is a function of several phenomena such that:

$$\beta_p(t) = \alpha_R(\theta_{R,p}) \alpha_T(\theta_{T,p}) e^{j2\pi v_p t} b_p(t) \qquad (2)$$

where $\alpha_R(\theta_{R,p})$ is the complex gain due to the angle of arrival (AoA) at the receiver and the antenna gain for that AoA, $\alpha_T(\theta_{T,p})$ is the complex gain due to the angle of departure (AoD) from the transmitter and the antenna gain for that AoD, $e^{j2\pi v_p t}$ is the rotational shift due to Doppler effects along that path, and $b_p(t)$ is a complex factor describing the strength of a multipath component $|b_p(t)|$ (from effects such as spreading and reflection) as well as the phase offset of a multipath component $\angle b_p(t)$ (from effects such as up-conversion to the carrier frequency and reflection).

The breakdown of $\beta_p(t)$ in equation 2 emphasizes that phenomena affect a multipath component as it transits its particular path. Depending on the measurement apparatus available to Bob, estimates of the various factors in equation 2 may or may not be available.

The channel model of equation 1 provides an intuitive bound on the amount of information available regarding the channel features that may be used to differentiate Alice from Eve. For example, if Alice and Eve were in the vacuum of space with no nearby objects, there would be little information regarding the channel features which might be leveraged for physical layer authentication. From equation 1, there would be only a single path of transmission, P=1, and only the effects of the LOS transmission path would exist and thus be available to differentiate Alice from Eve. On the other hand, if the environment were filled with many scatterers, P>>1, there would be many paths, each with unique features available to differentiate Alice from Eve. With many more features available to authenticate Alice, more information exists in the channel features which may be leveraged for authentication purposes. Simultaneously, because the model is based on the physical world phenomena of electromagnetic reflection, diffraction, and scattering, it is reasonably intuitive to associate a small P to a barren environment and a large P to an environment densely populated by various scatterers. Thus, the channel model of equation 1 provides an intuitive connection between physical objects in the environment and their mathematical representation.

In addition, the tap model of equation 2 separates the information of a channel tap $I_{T_i}^{AB_p}$ into features which depend on different phenomena. For example, the parameter $|b_p|$ represents the magnitude of a particular multipath component (i.e., tap magnitude), and it is affected by phenomena such as the distance of the path traveled and the reflectivity of surfaces off which it bounced. The parameter $\tau_p$, on the other hand, is only affected by the distance of the path traveled, and it is not significantly affected by the reflectivity of encountered surfaces. By leveraging a tap model of the form in equation 2, the information of a channel tap $I_{T_i}^{AB_p}$ may be considered relative to the phenomena that cause it. As such, Bob is empowered to leverage separate phenomena with separate priorities to authenticate Alice.

While there are many features for each multipath component, including the magnitude of gain along a path, $|b_p|$, the phase offset along a path $\angle b_p(t)$, the delay of a path, $\tau_p$, the Doppler shift along a path, $v_p$, the azimuth of the AoA at the receiver, $\theta_{R_{Az},p}$, the elevation of the AoA at the receiver, $O_{R_{El},p}$, the azimuth of the AoD at the transmitter, $O_{T_{Az},p}$, and the elevation of the AoD at the transmitter, $\theta_{T_{El},p}$, the time delay associated with each transmission path $\tau_p$ may be the most valuable feature for authenticating Alice. It is directly related to the position of Alice relative to Bob as the time delay $\tau_p$ is proportional to the path length $d_p$ of each transmission path $d_p = c\tau_p$. This means that a change in Alice's position may yield a change in the measured path delays. Additionally, $\tau_p$ changes rather slowly in typical wireless environments. Thus, $\tau_p$ may be leveraged when the time between channel estimates is too long for other features to exhibit adequate continuity for authentication purposes. Finally, $\tau_p$ is not affected by a large variety of phenomena, so it is simpler to model and predict. For these reasons, $\tau_p$ is the feature that is used in the authentication approaches described herein, although the other features may be used as well, or in addition to $\tau_p$. For example, the orientation of devices ($\theta_{R_{Az},p}$, $\theta_{R_{El},p}$, $\theta_{T_{Az},p}$, $\theta T_{El},p$) may be useful as they are directly related to Alice's position and are intuitive connections to the physical environment.

It may be challenging to obtain high accuracy synchronization of the time reference Alice is using to the time reference Bob is using. Thus, the LOS time of flight estimate may be challenging to obtain. If Bob is not well synchronized with Alice, then Bob may be uncertain when Alice began her transmission relative to when Bob received it. However, Bob does not need synchronization with Alice's time reference to accurately estimate the difference in delays between multipath components. Bob may simply assume the first multipath component (typically the LOS component) arrives at time $\tau_0 = 0$ and measure the subsequent delays relative to $\tau_0$. This prevents Bob from calculating direct range measurements to Alice, but if Bob has adequate knowledge of the environment, then the relative time delays may be leveraged to limit the possible locations from which Alice could have transmitted.

Challenges at Higher Carrier Frequencies

The shifting of wireless communication to higher carrier frequencies, such as the range of carriers above 24 GHz known as Frequency Range 2 (FR2) in the 5G-New Radio (NR) standard, has certain effects. The current channel-response-based physical layer authentication approaches assume a rich scattering environment, meaning there are many multipath components in the channel response (P of equation 1 is large). This is not realistic for frequencies above 24 GHz. Instead, surveys of channels at such high carrier frequencies indicate rather sparse conditions where few multipath components have significant energy.

To explain the reasons previous channel model assumptions become unrealistic at millimeter wave carriers, the channel model of equation 1 may be further defined such that multiple taps arriving at the same relatively time delay are appropriately considered. The channel model of equation 1 allows for several multipath components (several paths) to have the same relative delay (e.g., $\tau_4 = \tau_5 = \tau_6$). This allows for the case in which multiple distinct paths for signal energy to transit arrive at the receiver with the same relative delay or close enough to the same relative delay to be indistinguishable to Bob. However, from a receiver sensing perspective, Bob cannot decompose the components that all arrive with the same delay. This results in a single sensed channel tap gain for a given delay. For example, if three distinct paths yielded the same relative delay $\tau_i$, then Bob would only sense one channel tap with a delay of $\tau_i$, not three taps with the same relative delay.

Thus, the complex valued gain of each channel tap $\beta_p(t)$ is modeled as the sum of several sinusoidal components which all arrive at Bob simultaneously with varying phase and magnitude. This is often referred to as a tap cluster in channel-estimation literature, and it yields the following form for each channel tap gain:

$$\beta_p(t) = \sum_{n \in N_p} c_n e^{j(2\pi f_n t + \theta_n)} \qquad (3)$$

where n is the index of the $N_p$ sinusoidal components, which form the overall gain of the channel tap. Following the Jakes model, each of the sinusoidal components has a real-valued magnitude $c_n$ modeled by a Rayleigh distribution with parameter $\sigma_c^2$, a phase offset $\theta_n$ modeled with a uniform distribution over the range $[-\pi, \pi)$, and a Doppler shift $f_n$ modeled by the $f_n = f_D \cos(\alpha_n)$ where $\alpha_n$ has a uniform distribution over the range $[-\pi, \pi)$. The maximum Doppler shift is represented by $f_D$. For maximum Doppler shift, $f_D = 2v_{max} f_c/c$ where $v_{max}$ is the maximum relative speed, $f_c$ is the carrier frequency, and c is the speed of light.

A common assumption for $\beta_p(t)$ is that $N_p$ is large enough to invoke the central limit theorem. In the limit $N_p \to \infty$, $\beta_p(t)$ becomes a complex Gaussian process with zero mean and variance $\sigma_N^2$. This is often referred to as a Rayleigh fading channel, and is a common model in current channel estimation and physical layer authentication. However, the assumption that $N_p$ is large enough to invoke the central limit theorem is not supported by channel surveys at millimeter-wave frequencies. The millimeter-wave channel is typically sparse, meaning there are few taps (P is small) and the taps themselves are composed of few sinusoidal components ($N_p$ is small). As a result, there are significant changes to the distributions of $\beta_p(t)$.

Generally, the higher signal bandwidths expected with higher carrier frequencies increase temporal resolution of multipath channel taps, yielding more zero-magnitude taps between taps of significant magnitude. Additionally, spatial filtering from directional antennas reduces the overall number of observed taps. Lastly, the increased path loss at higher frequencies reduces the energy of long path-length multipath components below detectable levels further reducing the number of observed taps. Most importantly, the Rayleigh fading model for the channel tap $\beta_p$ (t) is not realistic because of the intracluster channel tap structure is sparse ($N_p$ is small). This has significant repercussions in physical layer authentication because it indicates that the fundamental statistical assumptions of current approaches (that $\beta_p$ (t) exhibits Rayleigh fading) are not realistic. Such sparsity of components in each channel tap causes several changes in the tap's stochastic behavior. First, the channel taps no longer exhibit the same variance nor average magnitude. Second, the autocorrelation function (ACF) of each tap now varies quite distinctly form one tap to the next, making it rather difficult to predict. And third, measuring a tap's statistical characteristics becomes quite time consuming. Accordingly, an autoregressive model of order 1 (AR-1), typically leveraged in channel-based authentication, does not capture the dynamics of even a Rayleigh fading tap ACF much less a sparse channel tap's ACF with its correlation parameter α. Thus, the stochastic assumptions of previous channel-based authentication approaches fundamentally fail to describe the behavior of sparse channel taps as the time between channel estimates $\tau_{ch}$ grows.

The time between channel estimates has a critical effect on the underlying assumptions of many channel-based physical layer authentication schemes. However, this particular aspect is not often explored as it can quickly make analysis intractable. Typically, it is assumed that channel estimation is performed frequently enough that the AR-1 model adequately captures the behavior of a channel tap from one estimate to the next. Essentially, at short enough time intervals, channel taps do not change much from one channel estimate to the next, and the AR-1 model may be assumed.

Examples are provided herein that are focused on the 5G-NR protocol. However, the embodiments described herein may be applied to other protocols and not limited to the 5G-NR protocol. Quantifying how much a channel tap is expected to change depends on several factors. For example, the expected change in a channel tap clearly depends on its constituent sinusoidal components, which in turn are functions of their relative magnitudes $c_n$, Doppler shifts $f_n$, and phases $\theta_n$. Additionally, the number of constituent sinusoidal components $N_p$ can significantly affect the expected change in a channel tap from one estimate to the next. These are physical phenomena that depend on the environment and carrier frequency; however, a more prominent non-physical effect can dominate the implemented time between channel estimates, resource scheduling.

The wireless medium is a shared resource. All the users in a local vicinity have to share access to the wireless medium. Almost all improvements to utilizing the wireless medium depend on the premise that the various transmitters will follow strict protocol requirements. A natural repercussion of such adherence to protocols is that a device cannot transmit arbitrary intervals simply to maintain channel estimates frequently enough to meet physical-layer authentication needs.

The following is an example of the competition between achieving optimal medium access for as many users as possible and achieving channel estimation frequently enough for physical layer authentication. Channel estimates conducted every 0.01 ms would enable the use of an AR-1 model as a realistic representation of how a channel tap changes from one channel estimate to the next. Achieving this would entail transmitting an adequate number of pilot tones at intervals not to exceed 0.01 ms. The 5G-NR standard is quite flexible allowing for a variety of configurations for the placement of pilot symbols for channel estimation referred to as the de-modulation reference signal (DMRS). Such pilot symbols may be inserted as frequently as four per slot, which depending on the numerology (a 5G-NR selection for subcarrier spacing and signal structure), could be as frequent as every 0.016 ms. While not quite the goal of at least every 0.01 ms, this is likely adequate to achieve reasonable estimates of the physical-layer authentication scheme performance with an AR-1 model.

However, the 5G-NR standard also allows the controller to schedule data exchanges for a registered device with periods up to 80 ms between transmissions. This implies that Bob (the receiver) may not receive a signal from Alice (the transmitter) with which to perform channel estimation for up to 80 ms since the last signal from Alice. So, when it is Alice's turn to transmit, she may include pilot symbols frequently enough for the AR-1 model during her time slot but then Alice will have to stop transmitting when her time slot ends and wait up to 80 ms before transmitting again. To enable many users access to the wireless medium, Alice is almost certainly not permitted to transmit continuously; she has to take turns with all the other users accessing the spectrum. Given the variety of configurations that might exist in a 5G-NR system, a fairly conservative estimate for the time between channel estimates is $\tau_{ch}=1$ ms. This is the standard sub-frame of 5G-NR, consistent across all numerologies.

However, the time between channel estimates expected for 5G-NR is too long for previously assumed models of channel tap behavior in physical layer authentication to be realistic. The need to share channel access and thus endure variably scheduled transmission windows makes it near impossible to measure the channel frequently enough to meet the assumptions of the AR-1 model. Even assuming the conservative minimum time between channel estimates of $\tau_{ch}=1$ ms, both the AR-1 model and the Rayleigh fading model yield poor estimates of a sparse tap's dynamics at walking speed Doppler shifts. That is, for millimeter wave communications in 5G-NR, a sparse channel tap's characteristics do not exhibit adequate continuity to be useful for authenticating Alice.

The likelihood a sparse channel tap is detected is an aspect of channel taps that exhibits useful continuity for authentication. The intra-cluster sparsity expected at millimeter-wave carriers combined with uncertain time between channel estimates makes it rather challenging to predict a tap's magnitude and phase from one channel estimate to the next. But, a tap's behavior may be considered from a stationary view. Meaning, the tap may be estimated at intervals such that the previous tap measurement cannot be leveraged to predict the phase or magnitude of the next tap measurement (successive measurements of a tap's magnitude and phase are uncorrelated), but the collection of a tap's measurements over many channel estimates will exhibit a consistent distribution dependent of the realized parameters of that tap.

The channel tap envelop is simply the magnitude of a channel tap $\beta\beta_p$ (t)| Over an adequately long time interval, a sparse channel tap exhibits a distribution of tap magnitudes conforming to the envelope probability density function (PDF) $f_{|\beta_p|}(z)$, which can be calculated using the following equation $$f_{|\beta_p|}(z)=(2\pi)^2 z \int_0^\infty [\Pi_{n=1}^{N_p} J_0(2\pi|c_n|x] J_0(2\pi zx) J_0(2\pi\rho x) x dx \quad (4)$$

where $J_0(\cdot)$ denotes the zeroth-order Bessel function of she first kind, x is a dummy variable, for integration, and ρ is the magnitude of a sinusoidal component with constant phase and magnitude and zero Doppler (such as a LOS component). Note the inclusion of ρ to describe a possible LOS-like component simply broadens the applicability of equation 4. If no LOS-like component is present (ρ=0), the the Bessel function yields one: $J_0(0)=1$. From the dependence of equation 4 on the realized parameters of the constituent sinusoids ($f_{|\beta_p|}(z)$ is a function of $c_n$), it is apparent that each tap realization can exhibit a distinct PDF making it challenging to predict. Additionally, Bob is not expected to have a means to reverse the superposition of the constituent sinusoids comprising a tap realization, and thus Bob does not have the knowledge of the $c_n$ values realized. This leaves Bob in a state where estimating $f_{|\beta_p|}(z)$ is difficult despite the fact that Bob would like to know $f_{|\beta_p|}(z)$ to determine an optimal threshold for authenticating decision statistic. An approach Bob might take to estimate $f_{|\beta_p|}(z)$ is to collect tap measurements and attempt to estimate parameters for $f_{|\beta_p|}(z)$ that best match his collected measurements, but this takes time to collect adequate measurements and substantial processing to find the parameter values which optimally fit the measured values. Instead, Bob may leverage the envelop cumulative distribution function (CDF) for the ensemble of all possible tap realizations $F_{|\beta|}=E\{F_{|\beta_p|}\}$ to estimate any sparse tap's envelope CDF $F_{|\beta_p|}$ as long as the range of the ensemble CDF $F_{11}$ is limited to relatively small tap magnitudes. The basic premise being that because all tap envelope CDFs are continuous and go to zero for a zero magnitude tap $F_{|\beta|}(|\beta|=0)=0$, the ensemble envelope CDF $F_{|\beta|}$ will be reasonably close to any other envelop CDF $F_{|\beta_p|}$ near $|\beta|=0$. Note that the subscript p for the ensemble CDF $F_{|\beta|}$ is purposefully removed as the ensemble CDF accounts for all possible realizations of a channel tap.

Despite the variability in the distributions of each sparse channel tap envelope, it is a reasonable estimate to model them with a single distribution at low magnitudes of $|\beta|$. For relatively small functions inputs, the ensemble envelope CDF reasonably estimates any sparse tap envelope CDF. Interestingly, the ensemble PDF of a channel tap envelope is the same for any number of constituent sinusoidal components. Whether $N_p=1, 2, 3, \ldots$, The PDF for the envelope of the ensemble is presented as follows $$f_{|\beta_p|}(|\beta|) = \frac{|\beta|}{\sigma_0^2} e^{-\frac{|\beta|^2+\rho^2}{2\sigma_0^2}} I_0\left(\frac{|\beta|\rho}{\sigma_0^2}\right), |\beta| \geq 0 \quad (5)$$

where $\sigma_0^2 = N_p \sigma_c^2$ is the parameter for the Rayleigh distribution describing the constituent sinusoid magnitudes, which has been consistently formulated as $$\sigma_c^2 = \frac{1}{N_p},$$

ρ remains the magnitude of a LOS-like component, and $I_0(\cdot)$ is the zeroth-order modified Bessel function of the first kind. The distribution of equation 5 is commonly known as the Rice distribution. The dependence of equation 5 from $N_p$ implies that in estimating any tap envelop CDF with the ensemble CDF, there is no need to calculate an ensemble CDF for each possible number of constituent sinusoids. The ensemble CDF is the same for any $N_p$.

Despite the incongruity between the ensemble CDF and the individually realized tap CDFs at mid-range tap magnitudes, at low tap magnitudes ($|\beta|<0.16$) the CDFs for the various tap realizations and the ensemble CDF become rather similar. The expected error between the ensemble CDF and the CDF for the magnitude of a realized sparse tap is less than 0.01 for tap magnitudes below 0.16. This implies that for the presented tap parameters, estimating the CDF for a sparse tap realization with the ensemble CDF yields a root mean square error of less than 0.01 if the CDF argument is less than 0.16 which is roughly 11% of the expected tap magnitude $0.16=0.11E\sqrt{\{|\beta|^2\}}$ where $E\{|\beta|^2\}=2N_p\sigma_c^2=2\sigma_0^2=2$. Thus, as long as the threshold for detecting a tap to be present is less than 10% of the ensemble's expected tap magnitude $$\frac{1}{10}\sqrt{E\{|\beta|^2\}},$$

it is expected that the ensemble CDF to yield results within 1% of the CDF for any sparse tap realization $F_{|\beta_p|}=F_{|\beta|}\pm0.01$.

When Rayleigh parameters for the constituent sinusoidal components are considered such that $$\sigma_c^2 = \frac{1}{N_p},$$

then $E\{|\beta|^2\}=2$. If the expected tap power, $E\{|\beta|^2\}$, can be predicted when $$\sigma_c^2 \neq \frac{1}{N_p},$$

then it is possible to scale the ensemble CDF parameter, $\sigma_0$ of equation 5 to yield the same mean value providing an ensemble CDF where $E\{|\beta|^2\}=2\sigma_0^2$ rather than $E\{|\beta|^2\}=2$. To predict the expected tap power $E\{|\beta|^2\}$ when $$\sigma_c^2 \neq \frac{1}{N_p},$$

the fact that energy in a multipath tap spreads out as it travels through space may be leveraged. Due to spreading, taps that arrive with longer relative delays are expected to exhibit smaller power. The tap cluster power is commonly modeled with an exponential loss such that the power of a tap cluster is $|\beta_p|^2=|\beta_0|^2 e^{-\tau_p/\Gamma} 10^{-Z/10}$ where $|\beta_p|^2$ is there power of the initially received tap (typically the LOS tap), $\tau_p$ is the relative delay of a tap, Γ is a parameter describing how fast the tap power diminishes, and Z is a normal random variable used to model shadowing independent of the tap delay $Z \sim N(0,1)$. The shadowing term goes to $$E\left\{10^{-\frac{Z}{10}}\right\} = 1.027$$

yielding $E\{|\beta_p|^2\}=1.027|\beta_0|^2 e^{-\tau_p/\Gamma}$. By scaling such that the LOS tap has unity magnitude $1.027|\beta_0|^2=1$, then the expected power of subsequent taps is as follows.

$$E\{|\beta_p|^2\}=e^{-\tau_p/\Gamma} \quad (6)$$

Thus, it is possible to estimate the expected squared magnitude of a tap without knowledge of $\sigma_0^2$, $c_n$ or $N_p$; all that is needed is the relative delay of the tap $\tau_p$ and the decay rate $\Gamma$.

To employ a channel-based authentication system in a given region at a prescribed carrier frequency, an offline channel survey may be performed to estimate the $\Gamma$ parameter. For example, it has been shown that survey measurements estimated $\Gamma$=31.4 ns for outdoor urban environments in New York City in modelling 28-GHz channels. Thus, similar survey efforts may be performed as needed.

From $E\{|\beta_p|^2\}$, the ensemble distribution parameter $\sigma_0$ from equation 5 is defined by $$\sigma_0^2 = \frac{E\{|\beta_p|^2\}}{2} \qquad (7)$$

wen there is no LOS-like component in the constituent sinusoids comprising a channel tap ($\rho$ of equation 5 is zero). Thus, it is possible to predict the ensemble CDF for a tap envelop from just the relative delay $\tau_p$ and the decay rate for the environment $\Gamma$. Assuming no LOS component ($\rho$=0), substituting equation 7 into equation 5, and integrating with respect to a dummy variable x yields the following.

$$F_{|\beta|}(z; \overline{|\beta_p|^2}) = \int_0^z \frac{2x}{\overline{|\beta_p|^2}} e^{-\frac{x^2}{\overline{|\beta_p|^2}}} dx \qquad (8)$$

where $\overline{|\beta_p|^2} = E\{|\beta_p|^2\}$.

For small tap magnitudes, the ensemble envelop CDF $F_{|\beta|}$ estimates any sparse tap envelope CDF $F_{|\beta_p|}$ as a function of the relative delay $T_p$. In equation, this is presented as:

$$F_{|\beta|}(z; \overline{|\beta_p|^2}) \approx F_{|\beta_p|}(z; \overline{|\beta_p|^2}), 0 < z \le \frac{1}{10} e^{\frac{-\tau_p}{2\Gamma}} \qquad (9)$$

where the channel tap magnitudes are scaled such that the LOS channel tap has unit magnitude. There are two assumptions that have been described in developing equation 9. First, the ensemble CDF $F_{|\beta|}$ may be used to estimate a sparse tap CDF $F_{|\beta_p|}$ at low magnitudes $0 \le z \le \frac{1}{10} E\{|\beta_p|\}$. Second, the average tap magnitude may be estimated from the tap's relative delay and the channel delay constant $$E\{|\beta_p|\} = e^{\frac{-\tau_p}{2\Gamma}}.$$

Essentially, the range over which the ensemble CDF is adequately similar to a sparse tap CDF is bounded, and the ensemble CDF parameter $\alpha$ is scaled so that the average tap power decays as expected with increasing relative delay.

With equation 9 established, it is possible to predict the likelihood a tap will be detectable in a subsequent channel estimate $P(|\beta_p| > \gamma_d)$ as long as the threshold for detecting a tap is small enough $$\gamma_d \le \frac{1}{10} e^{\frac{-\tau_p}{2\Gamma}}.$$

The likelihood a tap's magnitude will be above $\gamma_d$ in a subsequent channel estimate is as follows:

$$P(|\beta_p| > \gamma_d = 1 - F_{|\beta|}(\gamma_d; \overline{|\beta_p|^2}), \gamma_d \le \frac{1}{10} e^{\frac{-\tau_p}{2\Gamma}}. \qquad (10)$$

Accordingly, as described above, a feature of sparse channel taps that may be reasonably estimated by the ensemble statistics includes the likelihood a tap's magnitude would be above some small threshold $P(|\beta_p| > \gamma_d) = 1 - F_{|\beta|}(\gamma_d; \overline{|\beta_p|^2})$. At small threshold values, $$\gamma_d \le \frac{1}{10} e^{\frac{-\tau_p}{2\Gamma}},$$

the ensemble envelope CDF $F_{|\beta|}$. As long as the threshold is below a tenth of the expected magnitude of a tap, the ensemble CDF may have an expected error within 1% of the actual sparse tap CDF. Thus, despite the erratic channel tap behavior exhibited at millimeter-wave frequencies from one channel estimate to the next, there is some aspect to a channel tap that exhibits reasonable continuity over multiple channel estimates. That aspect is the detection of a channel tap magnitude above a small threshold.

Figure 2:
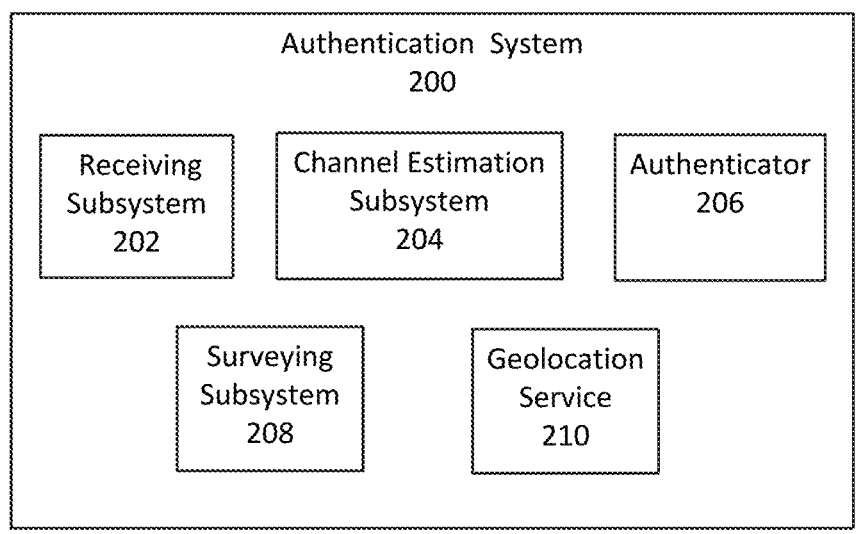
FIG. 2 illustrates an example embodiment of a millimeter-wave physical layer authentication system.

Example Embodiments of Channel-Based Authentication that Addresses Channel Sparsity FIG. 2 illustrates an example embodiment of a millimeter-wave physical layer authentication system. As shown in FIG. 2, authentication system 200 includes a receiving subsystem 202, a channel estimation subsystem 204, an authenticator 206, a surveying subsystem 208, and a geo-location service 210. System 200 may include other components not shown, and certain embodiments may be implemented with fewer components than the ones shown in FIG. 2. Each component of system 200 may be implemented by hardware and/or a combination of software and hardware, which may be custom or commercial off-the-shelf components. System 200 may be an integrated system or a system with distributed components.

Figure 3:
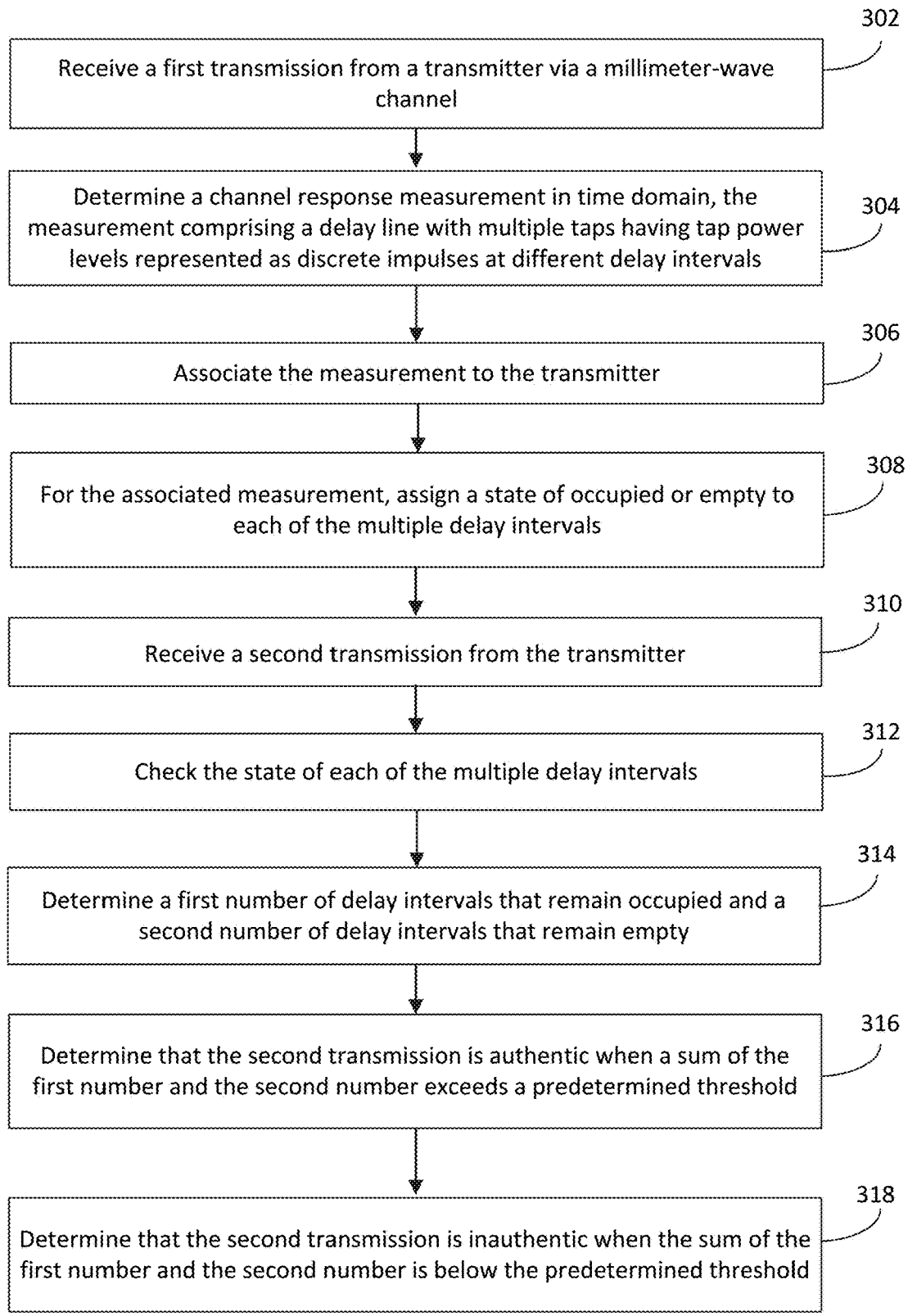
FIG. 3 illustrates an example embodiment of a process flow diagram for a method for millimeter-wave physical layer authentication that utilizes an initial alternate authentication mechanism.

Embodiments described herein may be implemented with system 200. For example, FIG. 3 illustrates an example embodiment of a process flow diagram for a method for millimeter-wave physical layer authentication that utilizes an initial alternate authentication mechanism. The operation of system 200 will be described in conjunction with the flow diagram of FIG. 3.

Assuming conditions exist such that an alternative authentication mechanism is available to authenticate a first transmission from a transmitter, by leveraging that alternative authentication mechanism it is possible to authenticate subsequent transmissions from the transmitter despite the variability expected in the time between channel estimates and in each tap's phase and magnitude due to sparsity and Doppler effects. Thus, Bob's measurement of the CIR, authenticated by other means, may be used to authenticate subsequent communications from Alice.

Referring to FIG. 3, in step 302, a first transmission is received from a transmitter via a millimeter-wave channel. For example, the first transmission may be received from a transmitter (e.g., transmitter 102 shown in FIG. 1) at a receiver (e.g., receiver 104 shown in FIG. 1). The receiver may be a part of or communicatively coupled with receiving subsystem 202 of system 200. Receiving subsystem 202 is configured to receive the transmission by the transmitter over a sparse wireless channel (e.g., with carrier frequencies above 24 GHz). For example, Alice initiates a communication session with Bob, authenticating herself by other means, such as RF fingerprint authentication or cryptographic techniques. Thus, Bob may be implemented as system 200 or a component thereof.

In an embodiment, steps 304, 306, 308, 312 and 314 may be implemented by channel estimation subsystem 204 of system 200 shown in FIG. 2. In step 304, a channel response measurement is determined in time domain, the measurement comprising a delay line with multiple taps having tap power levels represented as discrete impulses at different delay intervals. For example, the channel response measurement may be determined by channel estimation subsystem 204 of system 200 shown in FIG. 2. To continue with the example above, Bob is configured to make a measurement of the CIR during the alternative authentication and associates that measurement to Alice. For example, Bob may initially authenticate Alice based on a secret key known to Bob and Alice.

In step 306, the channel response measurement is associated to the transmitter. For instance, Bob may associate the channel response measurement to Alice after initially authenticating Alice.

In step 308, for the associated channel response measurement, a state of occupied or empty is assigned to each of the multiple delay intervals. For example, for the associated CIR, Bob determines which delay intervals have energy above a minimum detectable threshold and assigns them as occupied tap intervals to check in subsequent communications from Alice. Bob also determines the delay intervals where there is no significant energy and assigns such delay intervals as empty to check in subsequent communications from Alice.

In step 310, a second transmission is received from the transmitter. For example, receiving subsystem 202 is further configured to receive the second transmission by the transmitter over the same sparse wireless channel.

In step 312, the state of each of the multiple delay intervals are checked. To continue with the above example, in subsequent communication(s) from Alice, Bob measures the CIR and checks if the previously assigned occupied tap intervals remain occupied and the previously assigned empty tap intervals remain empty.

In step 314, determining a first number of delay intervals that remain occupied and a second number of delay intervals that remain empty.

In step 316, the second transmission is determined to be authentic when a sum of the first number and the second number exceeds a predetermined threshold. In step 318, the second transmission is determined to be inauthentic when the sum is below the predetermined threshold. To continue with the above example, if an adequate number of assigned tap intervals remain occupied/empty, then the communication is declared authentic. If too few of the assigned tap intervals remain occupied/empty, then the communication is declared inauthentic. In an embodiment, the predetermined threshold may be based on a desired false alarm rate that represents a likelihood that the second transmission is falsely determined to be inauthentic. In another embodiment, the predetermined threshold may be based on a desired miss rate that represents a likelihood that the second transmission is falsely determined to be authentic. The rates are described in detail below (e.g., in equations 18 and 19).

Leveraging the method shown in FIG. 3 to channel-based authentication, the likelihood a tap will be detected again in a subsequent channel estimate may be characterized with the ensemble CDF $F_{|\beta|}$ as described above. Thus, for each non-zero tap, the likelihood it remains above a small threshold in a subsequent channel measurement is $P(|\beta_p|>\gamma_d)=1-F_{|\beta|}(\gamma_d;\overline{|\beta_p|^2})$ where $\gamma_d$ is bounded such that $$\gamma_d \leq \frac{1}{10} e^{-\frac{\tau_p}{2\Gamma}}$$

and $\overline{|\beta_p|^2}$ is the expected tap power from equation 6.

For notation, Bob's measurement of the CIR may be described as $h(t,\tau)=[h_0(t),h_1(T), \ldots h_{L-1}(t)]^T$ with a fixed-length vector of length L where each index $l=0, 1, \ldots, L-1$ represents the delay relative to the LOS tap spaced at regular intervals of width $\in$ yielding $\tau_0=0, \tau_1=\in, \tau_2=2\in, \ldots \tau_{L-1}=(L-1)\in$. The delay interval for a given tap is the time range within $\pm\in/2$ of the tap delay $\tau_l$. Because at many relative delays there is no signal energy (the tap is unoccupied), an example CIR measurement might be $h(t, \tau)=[\beta_0(t), 0, 0, \beta_1(t), 0, \ldots 0, \beta_2(t), 0, 0]^T$. Note that the index p describes the non-zero multipath components of the CIR, and it is not the same as the index l, which denotes the elements of Bob's CIR measurement. The maximum value of p has a variable ceiling depending on the number of non-zero multipath components, while the maximum value of l always has the same ceiling L that is dependent on Bob's channel estimation approach. In short, p is the index for occupied tap slots while l is the index for both occupied and unoccupied delay slots. Thus, the number of occupied taps in $h(t, \tau)$ is L, and the number of unoccupied taps in $h(t, \tau)$ is L-P.

To describe the likelihood a delay slot remains empty $p_l^E$, a Poisson distribution may be leveraged to describe the likelihood a new random scatterer will yield a multipath component with a delay in a given time interval. Thus, the likelihood $p_l^E$ that a delay interval will be empty in the next channel estimate is the likelihood zero random scatterers occur in that delay interval. The likelihood of zero events in an interval for a Poisson distribution is given by:

$$P((|h_l(t+\tau_{ch})|\leq\gamma_d|(|h_l(t)|\leq\gamma_d)=p_l^E=e^{-\lambda_t}=e^{-\lambda_S\in} \tag{11}$$

where $\lambda_S$ is the average scatterer arrival rate and E is the time length of a delay slot as described above. Since each of the measurable relative delay bins is the same width $\in$, the likelihood is the same for each empty delay slot $p_2^E=p_3^E=\ldots p_{L-1}^E$. As such, the delay interval subscript may be removed $p_l^E=p^E$.

To describe the likelihood an occupied channel tap remains above a small threshold from one channel estimate to the next $p_l^O$, the low threshold CDF approximation of equation 8 may be leveraged. Note that the distinct relative delay of each occupied tap yields a distinct expected power for that tap and thus a distinct ensemble CDF. Despite having distinct CDFs, the likelihood each occupied tap remains above a small threshold is directly calculable from equation 10. The only two parameters needed to estimate the CDF for a tap envelop are $\Gamma$ and $\tau_p$. As mentioned above, $\Gamma$ may be estimated by offline surveys of the environment, and $\tau_p$ may be innately measured via Bob's channel estimation scheme. Thus, upon initial measurement of the CIR, Bob is able to estimate the likelihood a tap interval will be above a small threshold in the next channel estimate given it was occupied in the most recent channel estimate with $$P\left(\left(|h_l(t+\tau_{ch})| > \gamma_d \mid (|h_l(t)| > \gamma_d\right) = 1 - F_{|\beta|}\left(\gamma_d; e^{-\frac{\tau_l}{\Gamma}}\right)\right) \tag{12}$$

where the estimate is substituted for the average tap power $$\overline{|\beta_p|^2} = e^{\frac{-\tau_l}{T}}.$$

Finally, the chance a random scatterer occurs in the same interval that a tap was already occupying to estimate the likelihood an occupied tap remains occupied yielding:

$$p_l^o = \left(1 - F_{|\beta|}\left(\gamma_d; e^{\frac{-\tau_l}{T}}\right)\right) + e^{-\lambda_s \epsilon} - \left(1 - F_{|\beta|}\left(\gamma_d; e^{\frac{-\tau_l}{T}}\right)\right) e^{-\lambda_s \epsilon} \quad (13)$$

where the appearance of random scatterers is assumed to be independent of the taps magnitude [e.g., $P(A \cup B) = P(A) + P(B) - P(A)P(B)$]. The notation in equation 13 uses an O superscript to denote it is the likelihood a tap remains occupied and an l subscript to denote the delay slot to which the likelihood applies.

To leverage $p_l^O$ and $p^E$ for an authentication decision, a fairly intuitive decision statistic $\zeta_h$ for a channel-based authentication scheme may be counting the number of tap intervals in $h(t,\tau)$ that remain in the same state (occupied or empty). Thus, a random variable describing the number of NLOS delay intervals that remain occupied $O_h$ and a random variable describing the number of delay intervals that remain empty $E_h$ may be used to describe the decision statistic $\zeta_h = O_h + E_h$. The LOS delay interval l=0 will be occupied for any CIR be it from Alice or Eve, so only the NLOS (l≠0) are counted for the decision statistic $\zeta_h$. If $\zeta_h$ is too small, then too many taps have changed and it is not likely to be Alice.

To describe the distribution of $\zeta_h$ when it is actually Alice transmitting from one channel estimate to the next (commonly called the null hypothesis), the Probability Mass Function (PMF) of $E_h$ from one channel estimate to the next as Alice communicates to Bob $f_E[k]$ is considered. The number of tap intervals which remain empty $E_h$ may be represented as the sum of L−P Bernoulli trials. Since the likelihood a tap interval remains empty is the same for each empty tap interval $p^E$, the distribution $f_E[k]$ of $E_h$ is a binomial distribution B(n,p) where n is the number of trials and p is the probability of a trial success. Thus, the distribution for $E_h$ is $$P(E_h = k \mid \text{Alice transmitting}) = f_E[k] = \binom{L-P}{k}(p^E)^k(1-p^E)^{L-P-k} \quad (14)$$

which has an expected value of $E\{E_h\} = (L-P)p^E = (L-P)^{-\lambda_s \epsilon}$.

Describing the distribution $f_O[k]$ for $O_h$ is more complicated because there is a different probability associated to each of the P−1 occupied delay intervals. For example, if the second, fifth, and ninth delay intervals were occupied, then the unique delays for each interval ($\tau_2 = 2\epsilon$, $\tau_5 = 5\epsilon$, and $\tau_9 = 9\epsilon$) would result in three different likelihoods ($p_2^O$, $p_5^O$, and $p_9^O$) when substituted into equation 13 for a given detection threshold $\gamma_d$. The sum of non-identical Bernoulli trials yields a Poisson binomial distribution that has the following form:

$$P(O_h = k \mid \text{Alice transmitting}) = \sum_{A \in F_k} \Pi_{i \in A} p_i^O \Pi_{j \in A^c}(1 - p_j^O) \quad (15)$$

where $F_k$ is the set of all subsets of k integers that may be selected from $\{1, 2, 3, \ldots, P-1\}$, and $A^c$ is the complement of A, which is the set of delay intervals corresponding to the occupied tap index p. For example, if there were three non-zero taps after the LOS channel tap (P−1=3), then $F_2$ would be the set of the following subsets $\{\{1,2\}, \{2,3\}, \{1,3\}\}$ (the subsets of combinations of two from the p indexes). Applying equation 15 to the example where the second, fifth, and ninth delay intervals were occupied yields the result presented in Table 1 below.

TABLE 1

Example distribution for $O_h$

| k | Likelihood: $P(O_h = k) = f_O[k]$ |
|---|---|
| 0 | $(1 - p_2^O)(1 - p_5^O)(1 - p_9^O)$ |
| 1 | $p_2^O(1 - p_2^O)((1 - p_9^O) + p_5^O(1 - p_2^O)(1 - p_9^O) + p_2^O(1 - p_2^O)(1 - p_5^O)$ |
| 2 | $p_2^O p_5^O(1 - p_2^O) + p_2^O p_9^O(1 - p_5^O) + p_2^O p_5^O(1 - p_9^O)$ |
| 3 | $p_2^O p_5^O p_9^O$ |

Table 1 illustrates the likelihood that only two of the three occupied intervals remain occupied is calculated by considering each possible combination of two taps remaining occupied and the third tap becoming unoccupied and summing over all such combinations. This approach may be extended for any number of taps remaining occupied.

With the distributions $f_E[k]$ and $f_O[k]$ established for the case when Alice is the actual transmitter from one channel estimate to the next, the distribution for their sum is the convolution of their respective PMF's $f_\zeta[k] = f_E[k] * f_O[k]$. Thus, the PMF of the decision statistic may be determined in a manner that avoids the erratic nature of channel taps in millimeter wave channels.

The distribution of $\zeta_h$ if it is not Alice communicating from one channel estimate to the next will be described next. When Eve makes a spoofing attempt, she is expected to exhibit a different CIR than Alice. Eve's CIR is the result of Eve's position relative to Bob and the various scatters in the environment. To model Eve's CIR, assuming that it is independent of Alice's CIR and that the appearance of scatterers follows a Poisson distribution with the same decay parameter $\gamma_s$ as that of Alice. Thus, for any tap interval in the CIR from Eve to Bob, the likelihood one or more multipath components will occur is the complement to no multipath components occurring $1-p^E$. This yields a constant likelihood for each delay interval that it will be marked as occupied by Bob $P(|h_1(t)| > \gamma_d) = \ldots = 1-p^E$. Thus, tap intervals that were previously occupied in Alice's CIR have a rather low likelihood of being occupied in Eve's CIR when Eve transmits $1-p^E \ll p_l^O$. So, when Bob measures the CIR from Eve, it is expected to cause a rather different value for the decision statistic $\zeta_h$.

To present the distribution for the test statistic when Eve is making a spoofing attempt $f_{\zeta|spoofing}[k]$, $O_h$ is considered. Because the likelihood a tap occurs in any delay interval for Eve is modeled as constant, the distribution for $O_h$ when Eve is making a spoofing attempt is simply the sum of P Bernoulli trials each with probability $1-p^E$. Thus the PMF for $O_h$ becomes $$P(O_h = k \mid \text{Eve transmitting}) = \quad (16)$$

$$f_{O\mid spoofing}[k] = \binom{P-1}{k}(1-p^E)^k(p^E)^{P-1-k}$$

where there are P−1 NLOS occupied delay intervals for the CIR associated to Alice. Note that this is substantially different than $P(O_h=k\mid\text{Alice transmitting})$ from equation 15. For the case where no spoofing attempt is occurring, the likelihood a tap remains above threshold is rather high $$\left(p_l^O \approx 1 - F_{|\beta|}\left(\frac{1}{10}\sqrt{E\{|\beta|^2\}}\right) = 0.99\right).$$

While for the spoofing case, the likelihood a tap remains above threshold is rather small (e.g., if $\in=5$ ns and $\lambda_s=1/120$ ns$^{-1}$, then $1-p^E=1-e^{-\in\lambda_s}=0.04$). So, there is a rather substantial shift in the expected value of $O_h$ when Eve makes a spoofing attempt. When no spoofing attempt is occurring, $O_h$ has an expected value near the number of occupied NLOS taps P−1, but when a spoofing attempt occurs, $O_h$ has an expected value near zero.

With this model for Eve's CIR, the effect on $E_h$ when Eve makes a spoofing attempt is not as dramatic as that on $O_h$ described above. The likelihood Eve exhibits an empty delay interval at the same delay in which Alice had exhibited an empty delay interval is the same as that for Alice $p^E$. Thus the distribution for $E_h$ is the same whether Eve or Alice transmits $$P(E_h = k \mid \text{Eve transmitting}) = \quad (17)$$

$$f_{E\mid spoofing}[k] = f_E[k] = \binom{L-P}{k}(p^E)^k(1-p^E)^{L-P-k}$$

In many scenarios, it may be reasonable to assume a different random scatterer density $\lambda_s$ for Eve that would alter $f_{E\mid spoofing}[k]$.

The PMF of the test statistic $\zeta_h$ may be determined during a spoofing attempt by convolving the summed distributions $f_{\zeta\mid spoofing}[k] = f_{O\mid spoofing}[k] * f_{E\mid spoofing}[k]$ And with the PMFs of $\zeta_h$ during spoofing and non-spoofing cases established, $f_{\zeta\mid spoofing}[k]$ and $f_\zeta[k]$, respectively, the likelihood Bob misses a spoofing attempt (miss rate) and the likelihood Bob falsely accuses Alice of spoofing (false alarm rate) for a given threshold on the decision statistic $\lambda_\zeta$ may be determined. The miss rate is $$P(\zeta_h > \gamma_\zeta) = \Sigma_{k=\gamma_\zeta+1}^K f_{\zeta\mid spoofing}[k] \quad (18)$$

where K is the maximum value $\zeta_h$ can take K=L−1.
The false alarm rate is $$P(\zeta_h \leq \gamma_\zeta) = \Sigma_{k=0}^{\gamma_\zeta}[k]. \quad (19)$$

So, the threshold $\gamma_\zeta$ for the test statistic may be calculated for a desired miss rate or false alarm rate, but once $\gamma_\zeta$ is fixed, both the miss rate and the false alarm rate are fixed as well.

Figure 4:
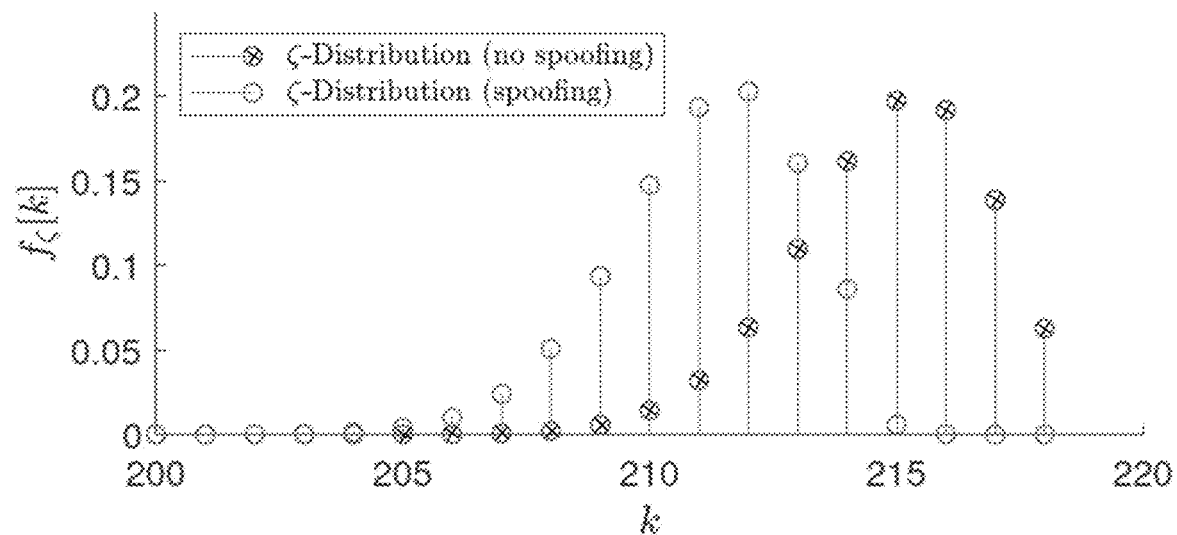
FIG. 4 illustrates example test statistic distributions for a physical layer authentication approach.

FIG. 4 illustrates example test statistic distributions for a physical authentication approach. The decision statistic and its distribution during spoofing and non-spoofing conditions are shown in FIG. 4, where $f_\zeta[k]$ is plotted for spoofing and non-spoofing conditions in an example scenario. The following parameters were selected for the example scenario with the intent to represent a relatively sparse channel (P and $N_p$ are small). (1) There are 218 NLOS delay interval bins in Bob's CIR measurement, L−1=218. (2) There are 4 occupied NLOS delay intervals in the CIR measurement, P−1=4. (3) The likelihood each occupied slot remains occupied from equation 10 is the following: $p_5^O=0.90$, $p_{55}^O=0.95$, $p_{101}^O=0.99$, $p_{180}^O=0.92$. (4) The likelihood an empty tap becomes occupied due to a random scatterer appearing is $1-p^E=0.018$.

As seen in FIG. 4, it is apparent the spoofing and non-spoofing distributions are different, and a threshold for the decision statistic may be selected based on the desired false alarm rate or miss rate. For this example, a threshold of $\gamma_\zeta=214$ minimizes the sum of false alarm rate and miss rate. The visualization of FIG. 4 suggests that modifications to the decision statistic to improve the separation of the spoofing and non-spoofing distributions are possible, such as only counting taps occupied or empty if they have power substantially above or below $\gamma_d$ or more heavily weighting occupied taps compared to empty taps.

Besides variations of the test statistic, there are also variations on channel modeling and channel estimation which may be explored regarding the method described in conjunction with FIG. 3. For example, different models for Alice's and Eve's CIR may be utilized, especially models that weight how likely a new channel tap is to appear in a delay interval based on its nearness to delay intervals with relatively high power taps. Physical objects tend to be clustered in space, so a model that clusters channel taps in delay may be more appropriate than the Poisson model. Different channel estimation schemes uniquely affect the measured features of the CIR, and the repercussions of such effects on channel-based authentication may be explored. In addition, the influence of noise on the CIR measurement may be highly dependent on the channel estimation scheme employed. As such, noise models in conjunction with channel estimation approaches present further opportunities to explore channel-based authentication at millimeter-wave carriers.

Example Embodiments of Delay-Focused Multi-Factor Channel-Based Authentication

The method described in FIG. 3 is based on tap detection, supported by an approach to estimating a sparse tap CDF with an ensemble CDF at low tap magnitude thresholds. This method relies on an alternative means of authentication initially. However, the capacity to authenticate the reported location of the transmitter without the need for an alternative authentication or a priori characterization and registration is appealing, and such an approach will be described next as the second authentication scheme.

Figure 5:
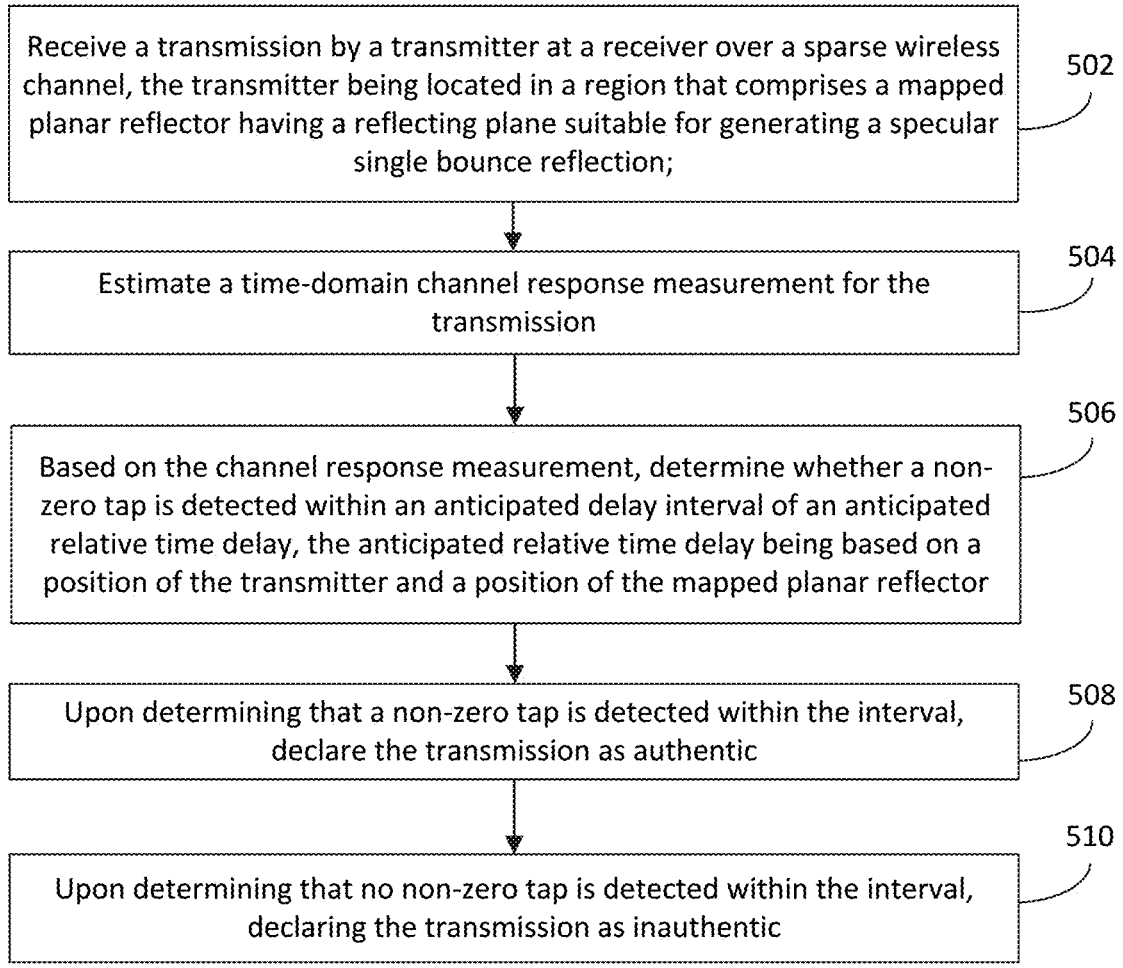
FIG. 5 illustrates one example embodiment of a process flow diagram for a method for millimeter-wave physical layer authentication.

FIG. 5 illustrates one example embodiment of a process flow diagram for a method for millimeter-wave physical layer authentication. The method of FIG. 5 may be implemented by various systems, such as system 200 shown in FIG. 2.

FIG. 5 begins with step 502, a transmission by a transmitter is received at a receiver over a sparse wireless channel, the transmitter being located in a region that comprises a mapped planar reflector having a reflecting plane suitable for generating a specular single bounce reflection. For example, the receiver may be a part of or communicatively coupled with receiving subsystem 202 of system 200. An example region is shown in FIG. 1, with building 106 acting as a planar or specular reflector having a reflecting plane suitable for generating a specular single bounce reflection. Building 106 may be mapped prior to the receipt of the transmission in an offline phase.

In step 504, a time-domain channel response measurement is estimated for the transmission. For example, the channel response measurement may be estimated by channel estimation subsystem 204. Note that in typical wireless communication systems, the data processing sequence does not require time-domain channel response measurement; therefore, the time-domain channel response measurement is not provided. Rather, the frequency-domain complex gains are determined, and there is no useful reason or straightforward way to convert the frequency-domain gains into the time domain. Thus, the time-domain channel response measurement described herein may be determined using various estimation techniques, for example, least squares estimate or compressive channel sensing estimate. The channel response measurement includes a delay line with multiple taps having tap power levels represented as discrete impulses at different delay intervals, the delay line including a first tap associated with a LOS multipath component and a second (and subsequent) tap(s) associated with the reflected multipath component(s) (NLOS). For the channel response measurement, the first tap occurs at a first delay interval and the second tap occurs at a second delay interval, the second delay interval being greater than the first delay interval.

In step 506, based on the channel response measurement, it is determined whether a non-zero tap is detected within an anticipated delay interval of an anticipated relative time delay, the anticipated relative time delay being based on a position of the transmitter and a position of the mapped planar reflector. For example, such determination may also be performed by channel estimation subsystem 204. The anticipated delay interval (e.g., $\Delta\hat{\tau}=\pm\in/2$ as described below) includes a lower bound that is less than the anticipated relative time delay and an upper bound that is larger than the anticipated relative time delay. The interval may be based on a delay error related to a desired security metric, including a miss rate or information entropy.

In step 508, the transmission is declared as authentic upon determining that a non-zero tap is detected within the interval. In step 510, the transmission is declared as inauthentic upon determining that no non-zero tap is detected within the interval. For example, these steps may be performed by authenticator 206.

In embodiments, the method of FIG. 5 may include more or fewer steps than shown. For example, the steps shown in FIG. 5 may be considered an online phase of the method. In embodiments, the method may have an offline phase that includes receiving location data of the transmitter, the location data indicating a position of the transmitter, for example, from a geolocation service 210 as shown in FIG. 2. Also during the offline phase, the method may include receiving a map of planar reflectors within the region, the map comprising at least one of location, orientation or physical extent information of the planar reflectors, for example, via surveying subsystem 208.

By providing information about the surrounding environment to Bob, for example, the orientation, location and/or physical extent of large specular reflecting planes, then Bob may accurately predict the expected channel response for any position of Alice. Such structures are common enough throughout the world to have broad applicability for embodiments described herein. Moreover, more complexly shaped structures may be reasonably approximated with relatively few planes. From such information, Bob may calculate a subset of channel features, namely, the delay of multipath components reflecting off such planes. While such features may not give Bob adequate knowledge to reconstruct the entire channel response, they are enough to at least partially realize Bob's goal of authenticating Alice.

Thus, embodiments described herein provide a physical layer authentication scheme based on the relative delay of multipath components when Bob knows Alice's position as well as the location and orientation of nearby planar reflectors that are large and stationary (e.g., the ground, a wall, or building façade), and the path for reflections from them are expected to be unblocked. Essentially, Bob leverages information about nearby planar reflectors and information about Alice's position as the inputs of an authentication algorithm, which outputs the relative delay of the reflected multipath component. Bob then verifies that the relative delay is exhibited in his measurement of the CIR and authenticates the claimed position of Alice. Note that this is not a geolocation of Alice's position as there are multiple positions from which Alice may transmit to yield the same relative delay, and many positions from which Alice could transmit that yield a different relative delay. While the relatively delay does not fix the position of Alice, it may be used as evidence to verify the claimed position of Alice.

There are significant advantages to this channel-based authentication approach that uses environmental information. First, it is resilient to the variability of channel tap gains from one channel estimate to the next; the channel tap only needs to be detectable from one estimate to the next. Second, if Alice has moved a significant distance from one channel estimate to the next, then this scheme may still function as long as the reported position of Alice is updated appropriately. Note that in traditional channel-based authentication, significant movement of Alice between channel estimates would cause the channel response to be drastically different, requiring a fresh alternative authentication for feature association. Third, such an approach causes the sparsity of the channel to be an advantage rather than a disadvantage; less multipath components in general means it is less likely random scatterers will cause a delay similar to the delay Bob is expecting. Finally and perhaps most importantly, this approach may not require an alternative authentication mechanism for feature association. Bob leverages his knowledge of planar reflectors as the side information from which he may verify Alice's reported location, not the side knowledge of a cryptography algorithm result. This means that if Eve had compromised Alice's cryptography token, then there is a means for Bob to detect Eve's spoofing attempt based on her exhibited channel response rather than just accepting Eve's channel response during initial authentication because her token matched.

In embodiments, in the offline phase, Bob surveys the geometry of nearby environment planar structures that would act as specular reflectors when Alice is in LOS of Bob. Bob retains the planar positions, orientations, and physical extents for use in the online phase. In the online phase, Alice initiates a communication session with Bob requesting to authenticate. Additionally, Bob is provided location data regarding Alice. The location data may be provided by Alice or by a separate geolocation service (e.g., geolocation service 210 shown in FIG. 2), such as a radar tracking system or a channel-response-based localization system. For the reported position of Alice, Bob determines if Alice is in the region where a mapped reflecting plane would generate specular single bounce reflection (SBR) and determines what the time delay of the reflected multipath component would be relative to the LOS multipath component for that planar reflector. Bob repeats this calculation of time delay for each planar reflector which would yield SBR for the reported position of Alice. Upon measuring the CIR, Bob assesses if multipath components occur near enough to the anticipated delays to authenticate the reported position of Alice. While a single planar structure is described herein, it is straightforward to repeat the analysis for additional planar structures.

To limit the extent of the analysis to a tractable scope, there are some assumptions made that emphasize the value of this approach as an independent factor for authentication as distinguished from traditional channel-based authentication. Additionally, Eve is assumed to be rather sophisticated, having the capacity to manipulate her own exhibited channel response to Bob (further distinguishing this approach from most channel-based authentication works). The assumptions are as follows. (1) Bob and the surveyed reflecting planes are stationary. (2) Error associated with Bob's knowledge of the reflecting planes is negligible. (3) Bob's channel estimation detects the plane's reflected multipath component within a prescribed delay tolerance. (4) Alice is mobile with a uniform distribution for her position in the region where SBR occurs. (5) Alice's position is reported to Bob with error bounds such that a maximum and minimum multipath delay can be determined for the error in position. (6) Eve can manufacture arbitrary false delay in her channel response. (7) Eve knows scenario geometry but not Alice's position. (8) Eve has compromised Alice's cryptographic token but does not iterate through attempts to deceive Bob with multiple false delays to avoid triggering an alarm and prompting new cryptographic token generation.

An example scenario meeting such assumptions may be where Bob represents an access point servicing a courtyard area. Bob may be fixed in some non-obtrusive position with the ground and various building surfaces across the courtyard fixed as well. The position of Bob relative to the ground and building surfaces may be easily and accurately measured via a variety of measuring techniques to include simple use of a measuring tape. Bob is expected to measure the CIR during communications with each user, and depending on the estimation technique used, the delay of multipath taps is measured with prescribed error characteristics. Mobile users transiting the courtyard represent Alice with their position just as likely to be one place in the courtyard as anywhere else (uniform distribution), and the position of the mobile users may be obtained from a variety of common sensory: cameras, Alice sharing her own global positioning system (GPS) fix, multi-aperture tracking, etc., each with unique error characteristics. For the given geolocation system leveraged (e.g., GPS), Bob determines the region(s) of positions in which Alice is expected (e.g., a 95% confidence ellipse from the GPS fix) and calculates the minimum and maximum delay Alice would exhibit for each applicable reflecting surface given such a range of positions. In this scenario, Bob may measure the CIR and check for a multipath delay in the calculated delay range for each applicable reflecting surface.

Continuing with the courtyard example, it is reasonable that Eve might be tipped off that Bob has implemented the second authentication scheme described herein. This is a notable adversary as Bob never has to announce the scheme's implementation, nor does Bob have to provide feedback that Alice has been successfully authenticated. Additionally, Bob never has to announce which planar reflectors he is leveraging for authentication. However, it is assumed that Eve performs surveillance of the courtyard to determine information regarding which planar reflectors Bob is likely to leverage and thus knows the scenario geometry. If Eve wanted to deceive Bob by adding a false delay into her own exhibited CIR, then she would have to determine at which delay to add a multipath component, which requires knowledge of Bob's position relative to the environment as well as Alice's relative position. Finally, Eve would also have obtained Alice's position information and the courtyard environment information that Bob is leveraging. The limitation we place on Eve is that she does not know Alice's position. Knowing Alice's position would require active tracking of Alice, and there are a variety of ways Alice might obfuscate her position to Eve ranging from physical barriers (e.g., privacy fencing) to electromagnetic countermeasures (e.g., decoys). Without knowledge of Alice's position, Eve has to guess which delay(s) to exhibit in her CIR but may make informed guesses based on previously collected surveillance.

Thus, the second authentication scheme described herein compliments cryptography-based authentication rather than depend on it. Eve may have compromised the cryptography via phishing, but defeating this scheme requires Eve to operate in a domain that is fundamentally separate from the cryptography domain. Not only does Eve have to collect information in the physical domain (Alice and Bob position data rather than cryptograph token data), but also Eve has to manipulate the physical domain. Eve has to contrive the capacity to add multipath delays to her exhibited channel response to Bob. Finally, Eve has to actively track Alice's position if Eve wants to avoid being caught using the compromised authentication token. Such additive burden is a substantial benefit of this scheme, as no individual security measure is fail proof. Rather, security systems tend to be organized holistically such that different measures implemented complement the weaknesses of the others. Thus, the feature of one measure does not cause the other measures to fail as well (as would be the case for traditional channel-based authentication during a compromised alternative authentication). By burdening Eve with several security measures with distinct information dependencies, the cost on Eve to defeat the overall security system is substantially increased, thereby reducing the chances that Eve will successfully defeat Bob.

Figure 6:
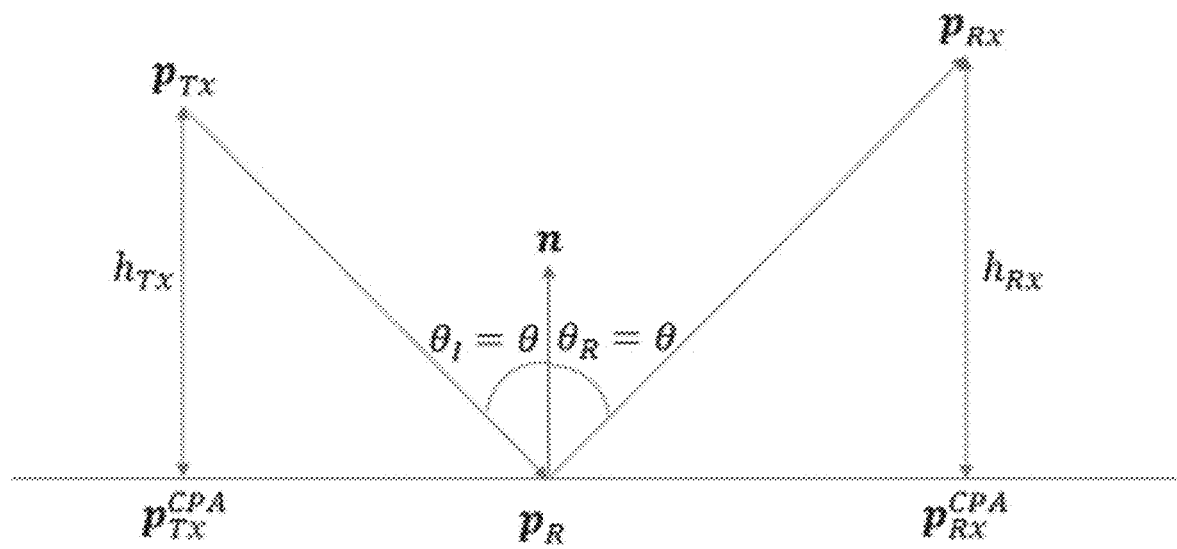
FIG. 6 illustrates specular reflection geometry.

FIG. 6 illustrates specular reflection geometry. For geometry 600 shown in FIG. 6, Bob acts as the receiver and Alice acts as the transmitter. Bob is located at position $p_{Rx}$ and Alice is located at $p_{Tx}$. Locations are described in Cartesian coordinates, thus $p_{Rx}=[x_{Rx}, y_{Rx}, z_{Rx}]^T$ and $p_{Tx}=[x_{Tx}, y_{Tx}, z_{Tx}]^T$. The reflecting plane is described by the orientation of its unit magnitude normal vector $n=[n_x, n_y, n_z]^T$ as well as the height of the receiver from the plane $h_{Rx}$. Alice's height from the reflecting plane is $h_{Tx}$, and the point of reflection is labeled $p_R$. The positions directly beneath Alice and Bob in the reflection plane are labeled $p_{Tx}^{CPA}$ and $p_{Rx}^{CPA}$, respectively, to indicate that they are the closet point of approach (CPA) of Alice and Bob to the reflecting plane. It is assumed that the reflecting plane extends infinitely in all directions to focus on the basic formulation of M. The scenario where the planar reflector no longer extends infinitely will be considered and described in conjunction with FIG. 10. The angle of incidence and the angle of departure of the reflected multipath component are equal, indicated by the θ label next to each angle arc in FIG. 6; this is the result of specular reflection.

The relative time delay or relative delay is denoted as Δτ to indicate that it is the difference in delay between the reflected path component and the LOS component. The mathematical formulation for the relative delay of SBR multipath components reflected from planar reflectors may be determined by defining each point of interest as a function of the following parameters: $p_{Tx}$, $p_{Rx}$, n, and $h_{Rx}$. Such parameters define the scenario geometry as they fix Alice and Bob relative to each other and relative to the reflecting plane, thus the points of interest ($p_R$, $p_{Tx}^{CPA}$ and $p_{Rx}^{CPA}$) may be derived as functions of these parameters. Based on $p_R$, the derivation of $\Delta\tau$ is simply the difference between the time required for light to traverse the reflected path and the time for light to traverse the LOS path. The point of reflection $p_R$ may be formulated as follows.

$$p_R = \frac{\Delta h + h_{Rx}}{\Delta h + 2h_{Rx}} p_{Rx} + \frac{h_{Rx}}{\Delta h + 2h_{Rx}} p_{Tx} - \frac{2h_{Rx}^2 + 2h_{Rx}\Delta h}{\Delta h + 2h_{Rx}} n \qquad (20)$$

where the point of reflection is formulated as a scaled sum of the vectors representing the positions of Alice and Bob as well as the vector describing the normal to the reflecting plane. The structure of equation 20 provides a formulaic insight regarding the point of reflection $p_R$. The point of reflection is typically sensitive to the normal vector orientation as n is scaled by the highest order terms. Each vector component of equation 20 is scaled by a factor with same denominator $\Delta h + 2h_{Rx}$, but the numerator of each factor is different. The numerator of the factor scaling the n component of equation 20 is $-(2h_{Rx}^2 + 2h_{Rx}\Delta h)$, which is the sum of two second order terms while the numerators of the $p_{Rx}$ and $p_{Tx}$ scaling factors are all first order terms. Thus changes in n tend to have a stronger influence on the point of reflection than changes in the position of Alice and Bob. This occurs because the normal vector n is unitless while the position vectors $p_{Rx}$ and $p_{Tx}$ have units of length to describe each dimension (e.g., the x-dimension of $p_{Rx}$ is measured in meters). Thus, the scale applied to the normal vector must have units of length so that the n term may be sensibly added to the $p_{Rx}$ and $p_{Tx}$ terms, meaning the numerator of n's scaling factor must have second order length units.

With the point of reflection formulated, the difference in time delay between the LOS and NLOS multipath components as a function of the same parameters is straightforward. The LOS distance is simply the $l_2$-norm between Alice's position and Bob's position $d_{Los}=|p_{Tx}-p_{Rx}|$, and the NLOS distance is the $l_2$-norm between Alice's position and the point of reflection added to the $l_2$-norm between Bob's position and the point of reflection $d_{NLOS}=|p_{Tx}-p_R|+|p_{Rx}-p_R|$. Finally, the time delay $\Delta\tau$ caused by each distance is achieved by scaling with the speed of light c yielding $$\tau_{LOS} = \frac{d_{LOS}}{c}, \tau_{NLOS} = \frac{d_{NLOS}}{c},$$

as follows.

$$\Delta\tau = \frac{\sqrt{d_{LOS}^2 + 4h_{Rx}\Delta h + 4h_{Rx}^2} - d_{LOS}}{c}. \qquad (21)$$

Thus, $\Delta\tau$ in a Cartesian-coordinate system may be formulated as a non-linear function of the distance between Alice and Bob $d_{LOS}$, Bob's height from the reflecting plane $h_{Rx}$, and Alice's height from the reflecting plane $\Delta h = h_{Tx} - h_{Rx}$.

To convert from the Cartesian form of equation 21 to the cylindrical form, the height dimensions are considered between coordinate systems and the radial dimension is a transformation based on height and distance. For example, if $h_{Rx}=5$ m and $\Delta h=1$ m in the Cartesian coordinate system, then $h_{Rx}=5$ m and $\Delta h=-1$ m in the cylindrical coordinate system. To determine the radial position of a point in the cylindrical system, the LOS distance and the relative heights of the Cartesian system may be transformed by leveraging the fact that the height and radial dimensions of the cylindrical-coordinate system are normal to each other:

$$d_{LOS}^2 = r^2 + \Delta h^2 \qquad (22)$$

Substituting equation 22 into equation 21 yields:

$$\Delta\tau = \frac{1}{c}\left(\sqrt{r^2 + (\Delta h + 2h_{Rx})^2} - \sqrt{r^2 + (\Delta h)^2}\right). \qquad (23)$$

As seen from equations 21 and 23, the point of reflection $p_R$ is sensitive to the reflecting plane's orientation and the relative delay $\Delta\tau$ is circularly symmetric. The relative delay may be bounded, as the range of $\Delta\tau$ is constrained by Bob's position relative to the reflecting plane. For the minimum value, $\Delta\tau$ is positive and real. This occurs because the NLOS path will always be longer than the LOS path. By definition, the LOS path is the shortest possible path between Alice and Bob and thus must be shorter than the NLOS path. As such, simply scaling the difference in distance between the NLOS and LOS paths by the speed of light (a positive number) will always yield a real positive result. Thus, the relative delay must be greater than or equal to zero, $\Delta\tau \geq 0$. The maximum relative delay $\Delta\tau_M$ occurs at r=0 and $\Delta h \geq 0$. Essentially, the maximum delay occurs when Alice is co-located with Bob. Depending on the position of Alice, changes in her position either radially or normal to the reflecting plan may cause significant changes in $\Delta\tau$ or may cause no change at all. The formula for $\Delta\tau_m$ is as follows.

$$\Delta\tau_M = \frac{2}{c} h_{Rx}. \qquad (24)$$

Thus, for a fixed height of Bob relative to the reflecting plane, the relative delay for the reflected multipath component is limited such that $$\Delta\tau \in \left[0, \frac{2}{c} h_{Rx}\right]$$

for any position or Alice. Regarding authentication value, such bounds on $\Delta\tau$ based on Bob's position relative to the reflecting plane indicate that if Bob is close to the reflecting plane ($h_{RX}$ is small), there is not a large range of values $\Delta\tau$ can exhibit ($\Delta\tau_M$ is small). Thus, there is a small range of values over which to differentiate Alice and Eve, generally reducing the effectiveness of $\Delta\tau$ as an authenticating feature.

The authentication techniques described herein depend on obtaining an estimate of the time-domain channel response in the form of equation 1, such that the relative delays of each multipath component may be leveraged to determine if a tap exists at the expected delay. However, the data processing sequence for wireless communications typically does not need to determine a channel model in the form of equation 1. Rather, for an orthogonal frequency division multiplexing (OFDM) structured signal, it is more common that a device determines the frequency domain complex gains for each sub-carrier frequency band that the device then uses to compensate for channel distortion on a subcarrier by sub-carrier basis. An explicit CIR is rarely determined because once the compensation gains for each sub-carrier are determined, the device simply applies the compensations and moves the data. There is typically no useful reason to convert the sub-carrier gains into the CIR. Fortunately, it is possible to estimate the CIR from sub-carrier gains. Two such estimation techniques include least squares estimate and a compressive channel sensing (CCS) estimate. Other estimation techniques may be utilized, including delay locked loops for estimating each channel tap. The choice of which channel estimation algorithm to use may be based on a variety of considerations, such as error structure, error bounds, complexity, cost, processing requirements, processing delay, ease of troubleshooting, and so forth.

The general idea of CCS and least square estimation is to find the best fitting parameters for a CIR that would yield the measured frequency-domain sub-carrier gains. The CIR is broken into taps spaced at discrete delays determined by the Nyquist sampling rate such that the shortest time between resolvable multipath components is $\in=1/W$ where W is the signal bandwidth. This yields a CIR of the form $$h(t,\tau)=[h_0(t),h_1(t), \ldots, h_{L-1}(t)]^T \quad (25)$$

where there are L resolvable multipath component delays each with a unique time variant complex gain $h_l(t)$. The delays for each resolvable multipath component are quantized to integer multiples of $\in$. For example, the relative delay of $h_3(t)$ is $3\in$. Note, this form for the CIR matches the notation described for Bob's measurement of the CIR as described above in reference to the channel-based authentication method based on low-threshold tap detection as shown in FIG. 3. That is, CCS or least squares estimation may be directly applied to implement the embodiments described herein, such as system 200 of FIG. 2, the method of FIG. 3 as well as the method of FIG. 5.

To illustrate CCS and least squares estimation, an example case applied to a 5G-NR signal at millimeter-wave frequencies is described. The goal of this example is to present favorable but realistic conditions for the implementation of the embodiments described herein. As such, the example is for a high signal-to-noise ratio (SNR) uplink signal (25 dB) to a base station for a large bandwidth signal (400 MHz) at millimeter-wave carriers [the n258 frequency band with frequency range from 24.25 GHz to 27.5 GHz in the Third Generation Partnership Project (3GPP)]. For simplicity, both the transmitter and receiver may be modeled as single aperture antennas noting that if multiple apertures were available single aperture processing may still be applied to the signal received at one antenna element. Some additional configuration settings for this 5G-NR example includes the following. (1) The sub-carrier spacing is 120 KHz. (2) To establish a 400-MHz bandwidth signal, this example uses 265 resource blocks establishing enough bandwidth for 3168 sub-carriers. (3) A quadrature phase shift keying (QPSK) symbol modulation for each sub-carrier. (4) The pilot tones (known as a DMRS in 5G-NR) are placed in the third and twelfth symbol periods of this example signal and they fill every other sub-carrier plot presenting 1584 pilot symbols covering 3168 sub-carriers in a single symbol period. (5) The cycle prefix length is 570 ns.

Figure 7:
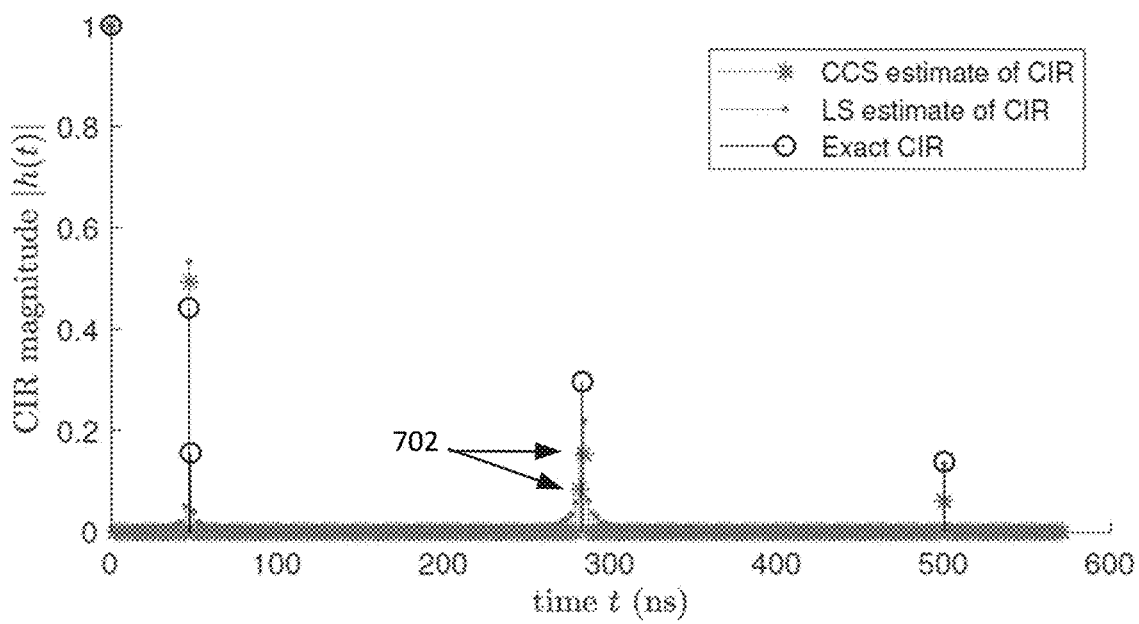
FIG. 7 illustrates a channel impulse response and estimates of the channel impulse response for an example 5G-New Radio signal.

The above 5G-NR example has four multipath components besides the LOS component and applies additive white Gaussian noise (AWGN). The exact CIR and estimates of the CIR from the pilot symbols of the third symbol period are presented in FIG. 7. FIG. 7 illustrates the channel impulse response and estimates of the channel impulse response for this 5G-NR example. As shown in FIG. 7, it is possible to identify the delay of significant multipath components for 5G-NR compliant signals with processing techniques. Bob could easily establish some small threshold (e.g., $\gamma_d=0.05$) to decide if a significant multipath component exits for each relative delay from the presented channel estimates. So, for example, if Bob were expecting a tap with a delay of 280 ns based on the reported position of Alice, then both the CCS estimate and the least squares estimate of the CIR would confirm a tap was present at such a delay. On the other hand, if Bob were expecting a tap with a delay of 150 ns for the reported position of Alice, then both the CCS and the least squares estimate would indicate Alice is not likely to be transmitting from the expected location.

The most significant factor causing the channel estimates in FIG. 7 to differ from the exact CIR is error from forcing the exact CIR that can have delays at any time over a continuous intervals to an estimated CIR that can only have delays at fixed discrete values. If the exact CIR has a delay between two integer multiples of the quantized delay intervals, the channel estimate smears the exact tap between the closest discrete taps. This is most obvious in FIG. 7 for the tap near 280 ns. The exact CIR has a delay at 283 ns while the closest taps for the CCS estimate and the least squares estimate are at delays of 281.5 ns and 284.1 ns. From the two asterisk taps (shown in FIG. 7 as 702), it is clear the CCS estimate smeared the exact CIR tap at 283 ns into the taps at 281.5 ns and 284.1 ns. The least squares estimate, on the other hand, smeared the tap into roughly the 14 closest taps ranging from 265 ns to 300 ns. The discretization in time can also smear multiple taps from the exact CIR into a single tap in the estimated CIR. This is illustrated by the two exact CIR taps near 50 ns in FIG. 7. There is a tap in the exact CIR at 47 ns and another tap at 48 ns; however, the CCS estimate only yields a single tap at 47.4 ns and the least squares estimate produces a rather large tap at 47.4 ns that quickly tapers down within two or three delay intervals. Because the estimated CIR discretizes the delays at which channel taps can exist, error is introduced in to the channel estimate.

The smearing effect from discretization in the time domain is not the only source of error in the channel estimate. There is also AWGN in the received signal. Although, for this example, AWGN is small as the signal is simulated with an SNR of 25 dB. Additionally, for CCS, the optimization problem attempts to minimize the $l_1$-norm of the resultant CIR estimate subject to an overall error constraint. This tends to suppress lower power channel tap magnitudes. This is most obvious for the tap near 500 ns in FIG. 7. Because the tap is the lowest power, it tends to have the smallest effect on the overall channel response. As such, the CCS algorithm suppresses its estimated magnitude as much as possible without exceeding the overall error bound for matching the measured sub-carrier gains. An opposite type of error effect occurs with the least squares estimate. Rather than suppressing small magnitude taps, the least squares estimates takes advantage of having many small magnitude taps to improve the estimation's match to the measured sub-carrier gains. This has the resultant effect of smearing the exact CIR taps over wider time intervals as illustrated by the broader tapering of the least square estimate taps indicated by dots in FIG. 7.

Despite the error sources mentioned above, this authentication method works. Bob can leverage channel estimation techniques on commonly available data to achieve a useful estimate of the CIR. It is useful in that Bob can clearly identify delay ranges where multipath components of significant energy are present and delay ranges where no significant multipath component is present. As long as the channel estimation scheme presents a delay measurement within some error bound, the achievable security effect can be analyzed for the worst case error. For example, from FIG. 7 it is reasonable to bound the delay error from CCS to within ±2∈ of the exact tap, and an error bound of ±7∈ may be appropriate for the least squares estimate. For such error bounds, Bob would detect the presence of a tap at the delay expected for the reported position of Alice as long as a multipath component occurred within 2∈ of the expected delay for CCS or within 7∈ of the expected delay for the least squares estimate. Here, ∈ is used to represent the tap delay spacing for the CIR estimation. This implies that if a random scatterer yields a multipath component with a delay within +2∈ of the anticipated delay for CCS, Bob will not detect spoofing if it is occurring. Essentially, the smearing of the CCS estimation would make it look like a tap occurred at the appropriate delay to Bob. While this highlights that there is potential to improve the security performance of the described second authentication scheme by improving the channel estimation approach (less smearing is desirable), the key insight is that the security performance can still be analyzed assuming a tap can occur at any delay within the error bound for the given channel estimation scheme. As such, security analysis can be achieved based on the error bounds of any channel estimation scheme.

With respect to the offline phase of the second authentication scheme, a variety of techniques are available to identify planar reflectors in the environment. For example, many geo-surveying approaches extract planar structures from collected survey data through different planar segmentation algorithms. If geo-survey data is not available, a technician can make manual measurements with various ranging tools. And interestingly, if Alice's position is known and associated with measurements of the delay difference in the CIR from the planar reflector, then the reflecting plane itself can be estimated from the collected delay measurements. Such an approach is particularly useful with regards to the second authentication scheme described herein. A surveying approach is available in "A Novel Method for Physical-Layer Authentication via Channel State Information," by S. Lord, J. Roth, J. McEachen, and M. Tummala published in the 12$^{th}$ International Conference on Signal Processing and Communication Systems (CSPSC'2018) and is hereby incorporated by reference in its entirety.

A least squares optimization approach to estimating the parameters for a specular reflecting plane: $n_x$, $n_y$, $n_z$, and $h_{Rx}$ is presented here. The premise is that if the receiver, Bob, knows the position of Alice and can measure $\Delta\tau$ for various positions of Alice, then Bob may estimate the reflecting plane which would generate such relative delays. This assumes that the relative delay measurements can be associated to a common reflecting plane and, under such assumption, demonstrate an example estimation of a reflecting plane. The goal of the example is to establish the optimization function for estimating the reflecting plane and illustrate its capacity to resolve a reflecting plane from delay measurements and position information.

Recalling the formulation for the delay of the NLOS multipath component relative to the LOS multipath component of equation 21, a more compact notation may be introduced where equation 21 is expressed as a function with the following inputs: the i$^{th}$ position of Alice $P_{Tx_i}$, the position of Bob $P_{Rx}$, the reflecting plane orientation n, and the height of Bob from the reflecting plane $h_{Rx}$. The notation is $$Q(P_{Tx_i}, P_{Rx}, n, h_{Rx}) = \Delta\tau_i \quad (26)$$

where i is the index for the various positions of Alice as she surveys an area to map a planar specular reflector. The premise is that Alice positions herself in a variety of locations. At each location, Bob knows his own position $P_{Rx}$, Alice's position $P_{Tx_i}$, and measures the channel response to obtain $\Delta\tau_i$. It is assumed that Alice positions herself in locations such that there is a LOS component to Bob and the reflected multipath component off the structure being surveyed may be identified in the channel response Bob measures. As such, for each location of Alice, a separate equation with four unknowns is established. The four unknowns are the parameters defining the reflecting plane ($n_x$, $n_y$, $n_z$, and $h_{Rx}$), and there is a separate equation for each position because $x_{Rx}$, $y_{Rx}$, $z_{Rx}$ change as Alice moves. Thus, for N survey locations of Alice, there are N equations but only four unknowns. Using the compact notation, the system of equations may be expressed as $Q(P_{Tx_1}, P_{Rx}, n, h_{Rx}) = \Delta\tau_1$ . . . $Q(P_{Tx_N}, P_{Rx}, n, h_{Rx}) = \Delta\tau_N$, which may be compacted further by grouping the parameters of the reflecting plane into a single vector $\Theta = [n_x, n_y, n_z, h_{Rx}]^T$ and by adding the subscript i to indicate unique coefficients exist in the function $Q_i(\Theta) = \Delta\tau_i$ based on the unique transmitter position of the i$^{th}$ survey location. Thus, the system of equations becomes: $Q_1(\Theta) = \Delta\tau_1$ . . . $Q_N(\Theta) = \Delta\tau_N$. With N locations surveyed and the resulting relative delays in the CIR measured, the problem of estimating the reflecting plane's parameters $\Theta$ may be framed as finding the $\Theta$ that yields $\Delta\tau_i$ values closest to those measured. To notate the measured time delays from the theoretical time delays, $\Delta\hat{\tau}_i$ is used to denote the delay that is calculated from equation 21, $Q_i(\Theta) = \Delta\tau_i$. Thus, the error between the measured and the theoretical delay for the i$^{th}$ geometry is $\epsilon_i = \Delta\hat{\tau}_i - Q_i(\Theta)$. The estimation of the plane becomes a constrained minimization problem of finding $\Theta$ which minimizes all $\epsilon_i$ values subject to definable constraints. The constraints include: Bob has a positive height ($h_{Rx} > 0$), Alice has a positive height ($h_{Tx} > 0$), and the normal vector has unit magnitude, $|n| = 1$. For the least square error the resulting constrained optimization is $$\operatorname*{argmin}_{\Theta} \sum_{i=1}^{N} \epsilon_i^2 \quad \text{s.t.} \quad n \cdot n = 1, h_{Rx} > 0, h_{Tx_i} > 0. \quad (27)$$

Figure 8:
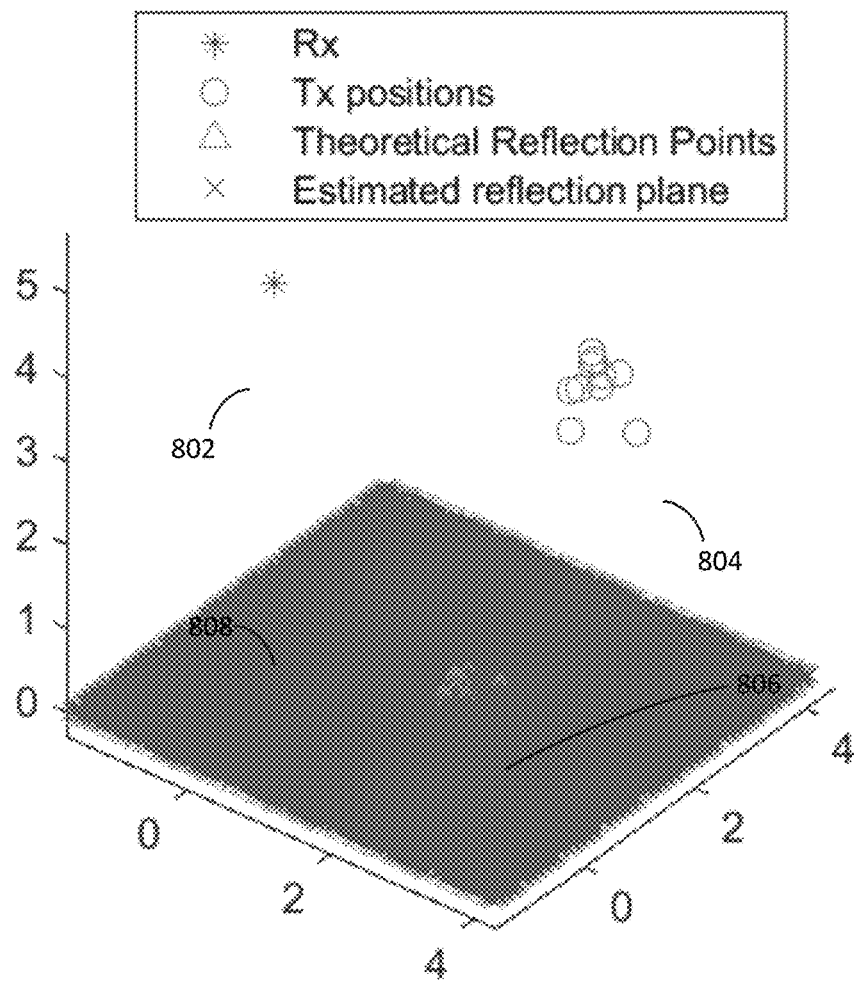
FIG. 8 illustrates an estimate of a reflecting plane from 10 different transmitter positions randomly selected from a uniform distribution over a cube with side length 1 m.
Figure 9:
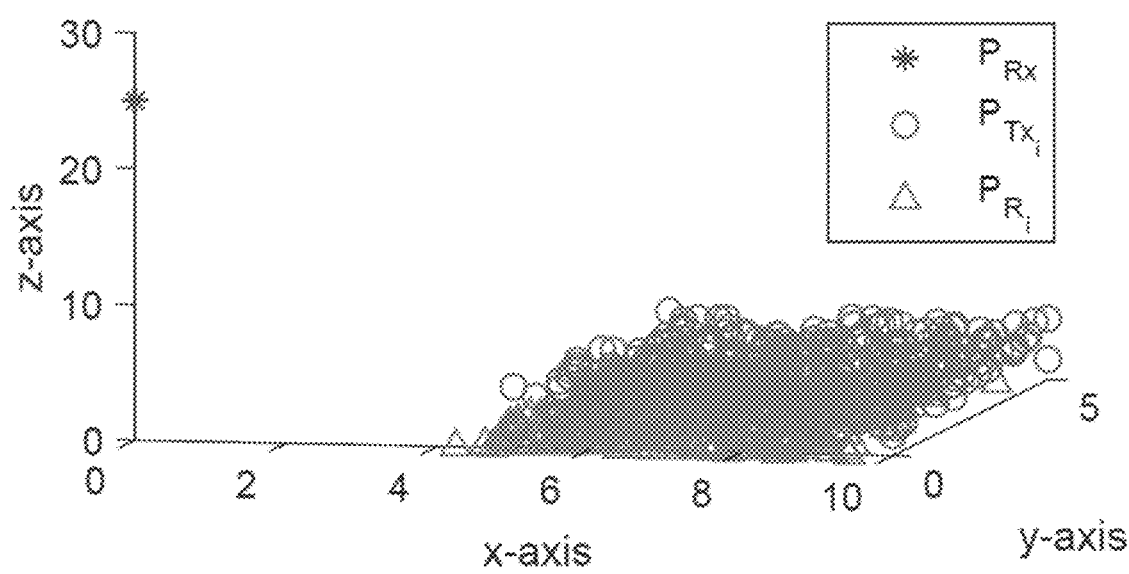
FIG. 9 illustrates a geometry of receiver and transmitter locations, and reflection points for simulations.

To illustrate the feasibility of such an approach at estimating a reflecting plane, a simple scenario is contrived for evaluation. The reflecting plane is the xy-plane. Bob is positioned at a height of 5 m above the xy-plane at the position [1 m, 1 m, 5 m]. Alice is given 10 locations randomly selected from a cube with side length 1 m centered at [3.5 m, 3.5 m, 3.5 m]. Finally, no error is introduced to the $\Delta\hat{\tau}_i$ measurements; the measurements exactly match the theoretical delays for a reflecting plane of $\Theta = [0, 0, 1, 5]^T$. The scenario is displayed in FIG. 8. FIG. 8 illustrate an estimate of a reflecting plane from 10 different transmitter positions randomly selected from a uniform distribution over a cube with side length 1 m. Bob's position is shown as an asterisk 802 in FIG. 8. Alice's positions are shown as circles 804 in FIG. 8. The theoretical reflection points are shown as triangles 806 in FIG. 8. The estimated reflection plane from the optimization result are shown as x's, labeled as 808 in FIG. 8. Note that the x's yield a visual effect of blurriness to the estimated reflecting plane in FIG. 8. This helps to emphasize that they represent an estimate of the reflecting plane achieved from the optimization problem solution; the actual reflecting plane for this scenario is the xy-plane. Even with perfect theoretical measurements $\Delta \hat{\tau}_i = \Delta \tau_i$ for each geometry, the optimization computation does not yield a perfect result for the reflecting plane due to challenges involved with actually solving equation 27. For a gradient descent approach to solving equation 27, the geometries in FIG. 8 yield $\Theta = [-0.0002, 0.0002, 1.0000, 5.0002]^T$ when the actual solution is exactly $\Theta = [0, 0, 1, 5]^T$. Thus, a plane may be estimated from delay measurements at different locations, and despite the challenge in finding a global minimum to equation 27, a reasonably close estimation of the plane may be achieved with a general optimization solver (gradient descent) under noiseless conditions.

Having demonstrated the feasibility of the approach to estimating the reflecting plane parameters $\Theta$ with perfect position and delay measurements, the effect of noise in the delay measurement and the effect of Alice's positions during surveying is described next. Rather than focusing on an algorithm to solve the optimization problem of equation 27, bounds of how well any algorithm could estimate the reflecting plane for a set of loosely constrained survey positions for Alice are determined. The intent is to examine how well an exhaustive search style algorithm may perform as more survey positions are introduced. Depending on channel conditions during each survey position, only a random subset of Alice positions provide a decent measure of $\Delta \hat{\tau}_i$. As more of such positions are added, how well any planar estimation algorithm can perform with respect to estimation error variance is considered. Such an examination is achieved through the calculation of the Cramer Rao Lower Bound (CRLB) for an assumed noise model and assumed distribution for Alice's positions during surveying. For noise, independent identically distributed (IID) is assumed, additive Gaussian noise $Z \sim N(0, \sigma_\tau^2)$ is present in each measurement, $\Delta \hat{\tau}_i = \Delta \tau_i + z_i$. And for Alice's positions, it is assumed Alice surveys from positions uniformly distributed in a rectangular prism.

Having assumed Gaussian noise in the delay measurements, the probability density function for a single delay measurement $\Delta \hat{\tau}_i$ may be expressed. Given Bob's position $P_{Rx}$, Alice's position $P_{Tx_i}$, and the reflecting plane characteristics $\Theta$, the probability density function for $\Delta \hat{\tau}_i$ is $$p(\Delta \hat{\tau}_i; \Theta, P_{Tx_i}, P_{Rx}) = \frac{1}{\sqrt{2\pi\sigma_\tau^2}} e^{\frac{-(\Delta \hat{\tau}_i - Q_i(\Theta))^2}{2\sigma_\tau^2}} \quad (28)$$

where the formula for a Gaussian distribution with a mean of the theoretical delay $Q_i(\Theta) = \Delta \tau_i$ and a variance of $\sigma_\tau^2$ is presented. Because the noise in each $\Delta \hat{\tau}_i$ measurement is independent of the other relative delay measurements, the joint probability density function for all N measurements is imply the product of the individual probability density functions. Thus, the joint probability density function for all N measurements $\Delta \hat{\tau} = [\Delta \hat{\tau}_i, \ldots, \Delta \hat{\tau}_N]^T$ is $$p(\Delta \hat{\tau}; \Theta, P_{Tx_1}, \ldots, P_{Tx_N}, P_{Rx}) = \prod_{i=1}^{N} \frac{1}{\sqrt{2\pi\sigma_\tau^2}} e^{\frac{-(\Delta \hat{\tau}_i - Q_i(\Theta))^2}{2\sigma_\tau^2}} \quad (29)$$

where the $\Pi_{i=1}^N$ operator indicates the product of all the terms. The CRLB is bound on the minimum variance an unbiased estimator can exhibit given the probability density function of the measurements involved in the estimation. Because the CRLB quickly becomes unmanageable symbolically, a numerical analysis of the CRLB is performed and features noted. The first feature is that the reflecting plane estimation improves with more geometries (the minimum variance of a parameter estimate decreases as the number of geometries included increases). The second feature is that once many geometries have been included, adding one more position and delay measurement does not do much to improve the plane's estimation (the minimum variance flattens when many geometries are included). The third feature of note is that CRLB is somewhat jagged at fewer geometries (<150 geometries). This is due to the method new transmitter positions were selected. By randomly selecting new transmitter position constrained to the 5 m×5 m×2 m region, occasionally a position would be selected which did not significantly improve the CRLB. For example, selecting a position close to a position already chosen typically does not improve the CRLB as much as selecting a position distant from previous positions. However, once enough positions have been randomly selected that the region is effectively saturated geometrically, the rate at which the CRLB decreases becomes quite slow and its shape rather smooth.

The distribution of $\Delta \tau$ that arises when the planar reflector no longer extends infinitely, but is instead bounded to a patch of limited extent will be described next. By bounding the extent of the reflecting plane, two significant constraints are implied: the region in which Alice can be positioned and still achieve SBR and the maximum relative delay $\Delta \tau_M$ that Alice can exhibit in that region. Such constraints are first defined for an arbitrary geometry and then the resultant distribution of delays assuming a uniform distribution for Alice's position in the applicable region is derived. Such derivations and supporting simulations are novel and it seems sensible that such derivations would not be of much interest in the past as their relevance is dependent on the recent combination of sparse channel response, high bandwidth signals, improved CIR estimation, and high accuracy geolocation data. The value of such mathematical formulations is that they present a means to estimates two significant security metrics for an arbitrary scenario geometry: the information entropy of the $\Delta \tau$-distribution and the likelihood Eve will inadvertently exhibit the same delay Bob is anticipating for the reported position of Alice.

Figure 10:
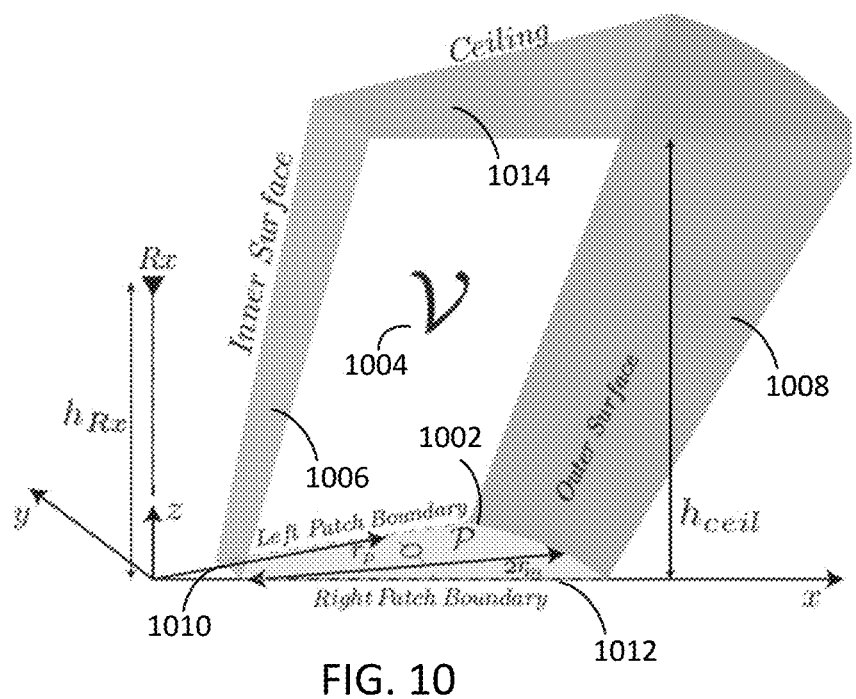
FIG. 10 illustrates a three dimensional view of an example allowable region V for an example reflecting patch P.

Because a cylindrical-coordinate system elegantly describes the behavior of $\Delta T$, a patch shape that is easily described in cylindrical coordinates are leveraged as shown in FIG. 10. FIG. 10 illustrates an example allowable region V for an example reflecting patch P. Bounding the reflecting surface to such a patch shape V for an example reflecting patch limits the region Alice can occupy and still exhibit SBR to a volume. FIG. 10 shows patch (P) 1002 as an annular ring circle sector, volume (V) 1004, which is bounded by an inner-radial surface 1006, outer-radial surface 1008, left-side surface 1010, right-side surface 1012, patch 1002, and ceiling patch 1014. The ceiling patch 1014 is the maximum height $h_{ceil}$ from the reflecting patch where Alice can be positioned and still achieve LOS and SBR to Bob. Such a height depends on a variety of factors such as the reflectivity of the patch, the strength of Alice's signal, physical boundaries in the environment, etc. To reduce the complexity, an arbitrary height $h_{ceil}$ is assumed rather than attempt to predict it from factors such as patch reflectivity and signal strength. Further, the ceiling patch is assumed to be parallel to the reflecting patch P, thus $h_{ceil}$ is constant throughout V. The inner-radial surface, outer-radial surface, left-side surface, right-side surface are oriented from the receiver's position, and they are functions of P and $h_{Rx}$.

To tie this model to example real-world scenarios, the reflecting patch might be a section of pavement on the ground or tinted glass on a building across the street from Bob, and the allowable region would be the positions above the pavement for the ground reflection or between Bob and the tinted glass for the building reflection. While using the term height implies the reflecting patch is the ground, the reflective patch may be any surface in any orientation. For example, it is known that concrete exhibits a reflection coefficient between 0.623 and 0.815. Tinted glass and clear glass exhibit reflection coefficients of 0.896 and 0.740, respectively. Such high reflection coefficients are more than adequate for the second authentication scheme described herein, as the premise is simply to detect the reflected multipath component. Finally, if one annular sector is inadequate to describe the actual reflecting surface near Bob, then additional annular sectors can be tessellated on the surface of the structure as needed to describe the reflecting patch. Other shaped regions, such as a rectangular prism shaped allowable region may also be used for conditions where Cartesian boundaries to V are more convenient.

To define P four parameters are used: $\theta_0$, $\theta_f$, $r_p$, and $r_m$. The angular extent of P starts at $\theta_0$ and ends at $\theta_f$. The center of P is a distance $r_p$ radially from the origin, and P extends from the center of the patch at a distance $r_m$ both towards the origin and away from the origin. $r_p$ describes how far away the patch is from Bob and $r_m$ describes how large the patch is radially. The range for the four parameters of P are as follows: $0 \le \theta_0$, $\theta_f \le 2\pi$ and $0 < r_m < r_p$. For the example patch illustrated in FIG. 10, the geometry parameters defining the patch and allowable region are the following:

$$\theta_0 = 0, \theta_f = \frac{\pi}{8}, r_p = 5, \text{ and } r_m = 2.$$

Figure 11:
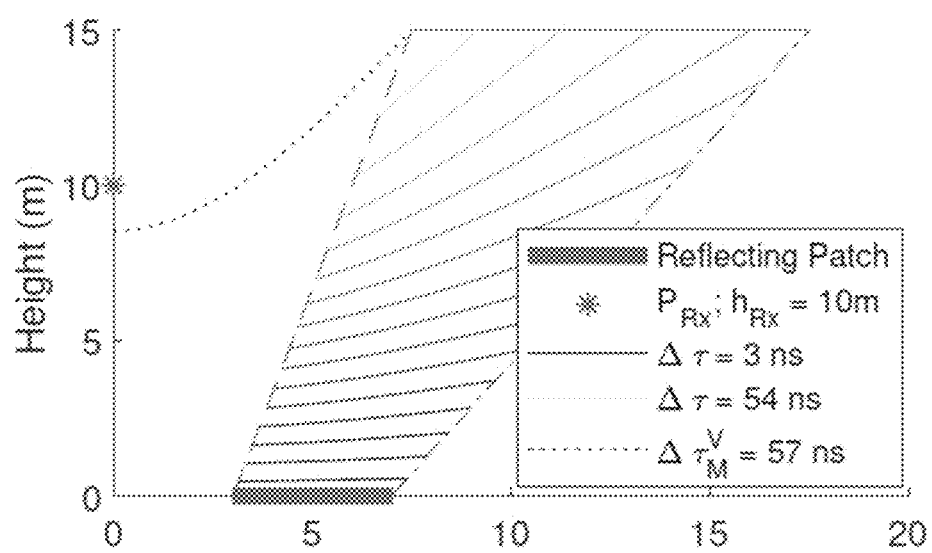
FIG. 11 illustrates a two dimensional side view of the example allowable region of FIG. 10.

By defining P as an annular sector, the reflecting patch is axially isotropic over its angular extent. This means that P is constant with respect to the cylindrical coordinate angle $\theta$ from $\theta_0$ to $\theta_f$, and V may be simplified to a two-dimensional side view over the reflecting patch, as shown in FIG. 11. FIG. 11 illustrates a side view of the example allowable region of FIG. 10. The geometry parameters defining region illustrated in FIG. 11 are the same as those for the three dimensional view presented in FIG. 10. Denoting the example geometry as $g_1$ with reflecting patch $P_1$ and allowable region $V_1$ yields $$g_1 = \left[\theta_0 = 0, \theta_f = \frac{\pi}{8}, r_p = 5, r_m = 2, h_{Rx} = 10, h_{ceil} = 15\right].$$

As shown in FIG. 11, several $\Delta\tau$-isocurves are illustrated in grey scales to represent positions where Alice would exhibit the same delay difference to Bob. Each lighter isocurve represents a delay difference approximately 3.5 ns larger than the previous delay difference. The maximum delay difference is $\Delta\tau_M^V$, and it occurs at the intersection of the ceiling boundary and inner-radial boundary. If the reflecting patch extended radially inward, the positions where $\Delta T = \Delta\tau_M^V$ are indicated with a dotted line.

To define the inner-radial boundary of an arbitrary allowable region V over its angular extent, its height $h_i$ may be presented as a function of radial distance r and scenario geometry g $$h_i(r; g) = \left(\frac{h_{Rx}}{r_p - r_m}\right) r - h_{Rx} \tag{30}$$

where g is used to indicate a dependence on the scenario geometry parameters: $g = [\theta_0, \theta_f, r_p, h_{Rx}, h_{ceil}]$. The function for $h_i(r; g)$ is only defined over the angular extent of the reflecting patch $\theta_0 \le \theta \le \theta_f$, but it is constant in those radial bounds. Similarly, $h_i(r; g)$ is only defined over the applicable radial extent $r_p - r_m \le r \le (h_{ceil} + h_{Rx})(r_p - r_m)/h_{Rx}$ to ensure $h_i(r; g) \in [0, h_{ceil}]$.

To define the outer-radial boundary of V, its height $h_o$ is expressed as a function of r and g as well to produce $$h_o(r; g) = \left(\frac{h_{Rx}}{r_p + r_m}\right) r - h_{Rx}. \tag{31}$$

Again, $h_o(r; g)$ is only defined over the angular extent of the reflecting patch $\theta_0 \le \theta \le \theta_f$, and its radial domain is constrained to $r_p + r_m \le r \le (h_{ceil} + h_{Rx})(r_p + r_m)/h_{Rx}$ to ensure $h_o(r; g) \in [0, h_{ceil}]$.

Both equations 30 and 31 arise from the nature of specular reflection in that the normal vector of the reflecting surface bisects the angle between the ray of incidence and the ray of departure. Regarding the inner-radial boundary, if the point of reflection is at the inner-radial edge of the reflecting patch, then the ray from the reflecting surface to Bob has slope $-h_{Rx}/(r_p - r_m)$. As such, the reflected ray from the same inner-radial edge of the reflecting patch away from Bob must have slope $h_{Rx}/(r_p - r_m)$. This ray off the reflecting patch's inner most edge away from Bob establishes a line of positions where for any position along that ray the point of reflection is the inner-radial edge of the reflecting plane. Such a line of positions is described by equation 30. For positions radially inward of the line defined by equation 30, the point of reflection shifts inward and thus beyond the extent of P. A similar argument holds for equation 31; except, positions radially outward of the line described by equation 31 shift the point of reflection radially outward beyond the extent of P. Thus, equations 30 and 31 define the inner and outer radial boundaries, respectively of V over the angular extent of P.

As shown in FIG. 11, the general tendency of $\Delta\tau$ is to increase as Alice moves away from the reflecting plane and radially inward (towards Bob). More specifically, it can be shown algebraically that the delay function described by equation 21 is an asymptotic non-decreasing function when the receiver's position is constrained to the inner-radial boundary described by equation 30 as $h_{ceil}$ approaches infinity. However, a more intuitive explanation through geometric arguments is that the delay difference grows monotonically as the transmitter moves higher along the inner-radial boundary. That is, an isocurve will pass through equation 30 at most once. This monotonic growth in $\Delta\tau$ is important to producing a formula for the CDF of $\Delta\tau$. $\Delta\tau$ grows as the transmitter progresses radially inwards and away from P along the inner-radial boundary, the maximum delay in V occurs at the intersection of the ceiling and the inner-radial boundary. The formula for the maximum relative delay in V (denoted $\Delta\tau_M^V$), after substitution of and simplification, is as follows.

$$\Delta\tau_M^V = \frac{1}{c}\sqrt{\left(\frac{(h_{ceil} + h_{Rx})(r_p - r_m)}{h_{Rx}}\right)^2 + (h_{ceil} + h_{Rx})^2} - \frac{1}{c}\sqrt{\left(\frac{(h_{ceil} + h_{Rx})(r_p - r_m)}{h_{Rx}}\right)^2 + (h_{ceil} - h_{Rx})^2}. \quad (32)$$

Error is expected from several sources for the second authentication scheme described herein. As such, some tolerance is allowed between the anticipated delay for the reported position of Alice and the measured delay from the CIR estimation. Thus, it is useful to know the likelihood that Alice's position will yield a relative delay in some range $P(\Delta\tau_{min} \le \Delta\tau \le \Delta\tau_{max})$. By determining the volume in V where such a range of delay is exhibited, it is possible to determine the likelihood Alice would be in a position to exhibit a relative delay in the range of interest. The formulas for such volumes in V may be derived by establishing functions describing the upper and lower volume boundaries in the height dimension of the cylindrical-coordinate system. Then, a three dimensional integral subtracting the lower boundary from the upper boundary over the appropriate radial and angular bounds is performed.

A function for the volume in V is established where a delay difference greater than or equal to some arbitrary $\Delta\tau$ is exhibited. Such a volume is labeled $V_g^+(\Delta\tau)$ where the superscript $^+$ denotes delays are above or equal to $\Delta\tau$ and the subscript g denotes dependence on the scenario geometry parameters defined by g. For example, in FIG. 11 the region above the bottom $\Delta\tau$-isocurve but still in the allowable region is denoted $V_{g_1}^+(\Delta\tau)$, and it is essentially all the volume of $V_1$ except the small sliver between the bottom $\Delta\tau$-isocurve (($\Delta\tau$=3 ns) and the reflecting patch $P_1$. Once a general formula for such a volume is established, finding the volume of positions in V where Alice's exhibited delay will be in an arbitrary range (denoted $V_{A-t}$) is rather straightforward ($V_{\Delta\tau} = V_g^+(\Delta\tau_{min}) - V_g^+(\Delta\tau_{max})$).

For delay differences such that $\Delta\tau_M^V < \Delta\tau$, there are no positions in the allowable region which would yield such a delay and $V_g^+(\Delta\tau) = 0$. For delay differences such that $0 < \Delta\tau \le \Delta\tau_M^V$, the $V_g^+(\Delta\tau)$ sub-volume is the cylindrical-coordinate integration of the top boundary minus the bottom boundary over the angular and radial extent:

$$V_g^+(\Delta\tau) = \int_{\theta_+}\int_{r_+}\int_{h_+} dh\, r\, dr\, d\theta \quad (33)$$

where $\theta^+$, $r^+$, and $h^+$ are the angular extent, radial extent and height extent of the $V_g^+(\Delta\tau)$ region. Recognizing that all the dependent functions are constant with respect to $\theta$ over the region's extent and substituting the boundary variables, equation 33 becomes $$V_g^+(\Delta\tau) = \begin{cases} \theta_P \int_{r_i^+}^{r_0^+} (h_T^+ - h_B^+) r\, dr, & 0 < \Delta\tau \le \Delta\tau_M^V \\ 0, & \Delta\tau_M^V < \Delta\tau \end{cases} \quad (34)$$

where $\theta_p = \theta_f - \theta_0$ and the arguments of the boundary functions have been dropped for compactness. Note that there are no pockets in the region described for $V_g^+(\Delta\tau)$ where the exhibited $\Delta\tau$ is less than that exhibited on the bottom boundary $\Delta\tau$-isocurve due to the monotonic nature of $\Delta\tau$ in V as mentioned above. A similar argument holds to be certain there are no pockets outside of the described region for $V_g^+(\Delta\tau)$ where the exhibited $\Delta\tau$ is greater than that exhibited on the bottom boundary $\Delta\tau$-isocurve, thus the region described for $V_g^+(\Delta\tau)$ includes only positions where the exhibited delay is greater than $\Delta\tau$ and all such positions in V.

Assuming a uniform distribution for Alice's position, the probability $\Delta\tau$ is between $\Delta\tau_{min}$ and $\Delta\tau_{max}$ is $$P(\Delta\tau_{min} \le \Delta\tau \le \Delta\tau_{max}) = \frac{V_g^+(\Delta\tau_{min}) - V_g^+(\Delta\tau_{max})}{|V|} \quad (35)$$

where $|V|$ is the total volume of V. Note that $V_g^+(\Delta\tau)$ is a continuous differentiable function, thus a continuous closed-form CDF may be presented. The likelihood that a realized delay difference from Alice's position (denoted $\Delta\tau_A$) is less than or equal to some arbitrary value $\Delta\tau$ is $$P(\Delta\tau_A \le \Delta\tau) = F_{\Delta\tau_A} = 1 - \frac{V_g^+(\Delta\tau)}{|V|} \quad (36)$$

where the domain of $\Delta\tau$ is $0 \le \Delta\tau \le \Delta\tau_M^V$ and $|V|$ is the total volume of V.

In the event Alice's position distribution is not uniform in V, the derivation described herein retains utility in that it still enables a useful calculation of the likelihood that Alice will exhibit a relative delay in some defined range. Since all the boundary definitions for the $V_g^+(\Delta\tau)$ region do not change whether Alice's position distribution is uniform or otherwise, the PDF for Alice's position $f_{P_A}(r_A, h_A, \theta_A)$ can simply be inserted into equation 33 and evaluated over the same bounds for r, h, and $\theta$ to calculate the likelihood of SBR yielding a delay in the defined range. In algebraic form, such substitution yields the following:

$$P(\Delta\tau_{min} \le \Delta\tau \le \Delta\tau_{max}) = \int_{\theta_+}\int_{r_+}\int_{h_+} f_{P_A}(r_A, h_A, \theta_A)) dh\, r\, dr\, d\theta \quad (37)$$

where $\theta^+$, $r^+$, and $h^+$ are the same angular extent, radial extent and height extent of the $V_g^+(\Delta\tau)$.

Figure 12:
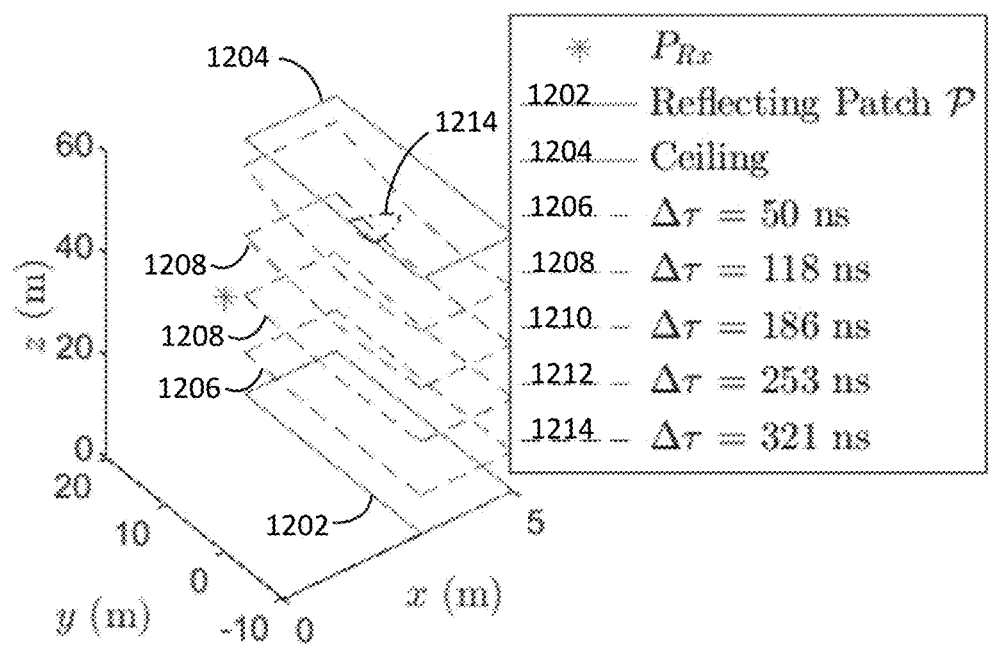
FIG. 12 illustrates a rectangular prism geometry for an example allowable region.

For a variety of scenarios, it may be useful to be able to describe the allowable region as a rectangular prism instead of a circular annular sector patch. FIG. 12 illustrates a rectangular prism geometry for an example allowable region. In the scenario of FIG. 12, a 30 m wide building façade is 50 m away from Bob and acts as a reflecting plane. The physical ground on which the building stands may be described by a plane parallel to the yz-plane at x=5 m. Bob is suspended at a height of 5 m from the physical ground (the physical ground is not the reflecting plane), and Alice is restricted to a height within 2 m of the physical ground. It is assumed that the rectangular prism is within a region where SBR and LOS transmission will occur rather than explicitly stating all the requisite bounds on the reflecting patch. For the scenario of FIG. 12, it is much easier to define Alice's allowable region in Cartesian coordinates and avoid the burden of describing the reflecting patch (a rectangular shaped building façade) in cylindrical coordinates.

In the scenario of FIG. 12, Bob is positioned at point $p_{Rx} = [0, 0, h_{Rx}]^T$ without loss of generality. The reflecting patch is in the xy-plane, and the [lower, upper] bounds of Alice's rectangular-prism-shaped allowable region (still denoted as V) are the following: $[x_{V-}, x_{V+}]$, $[y_{V-}, y_{V+}]$, and $[z_{V-}, z_{V+}]$. Since the reflecting plane is in the xy-plane, $z_{V-} = 0$ and $z_{V+} = h_{ceil}$. Thus, the illustrated allowable region of FIG. 12 has the following parameter values: $h_{Rx}=50$ m, $z_{V-}=0$, $z_{V+}=50$ m, $y_{V-}=10$ m, $y_{V+}=20$ m, $x_{V-}=3$ m, and $x_{V+}=5$ m. To avoid extensive piecewise, it is assumed that the prism only exits on one side of Bob in the x-dimension ($0 \le x_{V-} < x_{V+}$) and on both sides of Bob is in they-dimension ($y_{V-} \le 0 \le y_{V+}$). From a top-down view, this implies the rectangular prism is on only one side of Bob in the x-dimension and directly across from Bob (not diagonal) in they-dimension. The formulations described herein may be expanded to include geometries where Alice is on both sides of Bob in the x-dimension by iterating a second rectangular prism volume. For geometries where the reflecting plane is not directly across from Bob in the y-dimension (diagonal scenarios), the allowable region becomes a skewed prism whose boundaries may be described similar to the inner-radial and out-radial boundaries described for the circular annular sector patch.

By conducting a three dimensional integral of the difference in height between the ceiling of the prism and the $\Delta\tau$ iso-surface described by $h_{\Delta\tau}(\sqrt{x^2+y^2}; g)$ over the applicable region, the volume of the $V_g^+(\Delta\tau)$ region may be formulated by $$V_g^+(\Delta\tau) = \int_{x_b}\int_{y_b} h_{ceil} - h_{\Delta\tau}(\sqrt{x^2+y^2}; g) dy dx \qquad (38)$$

where $x_b$ and $y_b$ describe the region of positions in the ceiling of the prism where exhibited delay differences are above $\Delta\tau$. $V_g^+(\Delta\tau)$ may be expressed in Cartesian coordinates as $$V_g^+(\Delta\tau) = f_{x_{b-}}^{x_{b+}} z_{V+}(y_{b+} - y_{b-}) + H_{\Delta\tau}(x, y_{b-}) - H_{\Delta\tau}(x, y_{b+}) dx, \quad 0 \le \Delta\tau \le \Delta\tau_M^V \qquad (39)$$

where $H_{\Delta\tau}(x,y)$ is the anti-derivative of $h_{\Delta\tau}(\sqrt{x^2+y^2}; g)$ with respect toy and $\Delta\tau_M^V$ is the maximum delay achievable in V that occurs at $x=x_{V-}$, $y=0$ and $z=z_{V+}$. The formula for $H_{\Delta\tau}(x,y)$ is $$H_{\Delta\tau}(x, y) = \frac{c\Delta\tau(yb_1(x,y) + \log(b_1(x,y) + y)(x^2 + h_{Rx}^2 - c^2\Delta\tau^2/4))}{\sqrt[2]{4h_{Rx}^2 - c^2\Delta\tau^2}} \qquad (40)$$

where $b_1(x,y) = \sqrt{x^2 + y^2 + h_{Rx}^2 - c^2\Delta\tau^2/4}$. While equation 39 nor the anti-derivative of $H_{\Delta\tau}(x,y)$ with respect to x are not a closed-form equations, a variety of algorithms may be used to evaluate definite integrals for defined parameter values within an arbitrary precision such as the "vpaintegral( )" function in MATLab®. With $V_g^+(\Delta\tau)$ formulated, the CDF for $\Delta\tau$ in the rectangular prism follows the same form as equation 36, $$F_{\Delta\tau_A} = 1 - \frac{V_g^+(\Delta\tau)}{|V|}.$$

The second authentication scheme may achieve certain security metrics, including information entropy and miss rate. Information entropy is a measure of how challenging it is for Eve to determine the relative delay Bob is anticipating, and miss rate is a measure how likely Eve is to inadvertently exhibit a delay which successfully deceives Bob. Both metrics are directly influenced by various sources of measurement error. By analyzing the metrics for a given scenario geometry and worst case measurement error, quantifiable measures may be provided regarding the overall effectiveness of the authentication scheme in a given scenario. Additionally, such analysis presents the overall error that can be tolerated to achieve some security metric, establishing a design budget for system engineering purposes.

The authentication schemes described herein include multiple subsystems to be implemented, such as a geolocation service that communicates Alice's position to Bob; a channel estimation system that detects the delays of multipath components; and a surveying system that collects the positions, bounds, and orientations of nearby reflecting planes. Error in any of these subsystems may affect the performance of the authentication schemes. A security analysis is provided herein regarding the utility of the second authentication scheme with various subsystems abstracted as modular components. To achieve such security analysis, how well the authentication scheme performs provided the overall error of the various subsystems is bounded to some maximum delay measurement error, $\in$, is considered. This establishes an error budget that may be split up between the various subsystems during system design.

For example, if the overall delay error that can be tolerated is 5 ns, then perhaps 3 ns of the error can be tolerated from the channel estimation subsystem, 1.9 ns of error can be tolerated from the geolocation system, and 0.1 ns of error can be tolerated from planar surveying error. As long as each subsystem meets its error tolerances, the overall security metric desired may be achieved.

The geolocation subsystem's error and the surveying subsystem's error are described in terms of relative delay because error in position may be transformed into delay error. This transform is performed by considering the range of delays achievable for the range of locations in which Alice could be positioned or the range of values in the geometry scenario parameters surveyed. For either error source, a minimum relative delay $\Delta\tau_{min}$ and a maximum relative delay $\Delta\tau_{max}$ for the worse case can be determined, and thus the anticipated delay or anticipated relative time delay $\Delta\tau_A$ for the reported position of Alice is within some range $\Delta\tau_A \in [\Delta\tau_{min}, \Delta\tau_{max}]$. Note that such error is not expected to be uniform throughout the allowable region where Alice exhibits SBR. Some positions may exhibit more or less error than other positions, and error in different location dimensions may be amplified or suppressed when transformed into relative delay bounds.

The security metrics of the geometry scenario as a whole is of interest here, not the security metrics for each possible location of an allowable region. Essentially, a single metric for an entire allowable region is produced rather than a matrix of elements describing the security metric at various positions in the allowable region. As such, it is assumed that the delay error limits are met throughout the allowable region. There may be locations where the delay error caused by position error is much less than the delay error bound; however, through the allowable region, the delay error will never exceed the prescribed bound. This is assumed for all sources of error. Thus, for a given scenario, the information entropy and miss rate are of interest, given the delay error from all sources is bound such that the anticipated delay $\Delta\tau_A$ is within $\in/2$ of the measured delay.

Such measurement error model fits the discretized CIR estimation model rather well, simply by considering how the system performs if the delay taps are discretized at delay intervals of the overall system delay error. For the reported position of Alice, Bob calculates the anticipated delay $\Delta\tau_A$ (from equation 21). Bob also determines the closest observable delay tap $\Delta\hat{\tau}\in[0, \in, 2\in, 3\in, \ldots, (L-1)\in]$ such that $\Delta\hat{\tau}-\in/2\leq\Delta\tau_A<\Delta\hat{\tau}+\in/2$. Bob will detect a non-zero tap at the anticipated measureable delay M as long as any multipath component of significant power has a delay in the range $\Delta\hat{\tau}\pm\in/2$. The multipath component may be from reflection off of the surveyed plane P or from some other random scatterer with a delay M such that $\Delta\hat{\tau}-\in/2\leq\Delta\tau_A<\Delta\hat{\tau}+\in/2$. Also, Bob is unable to determine how many multipath components arrive in the time interval $\Delta\hat{\tau}\pm\in/2$, only that there were more than zero. Thus, if Bob detects a non-zero tap in the anticipated range $\Delta\hat{\tau}\pm\in/2$, then Bob determines the transmission is from the reported location whether it is from reflection off P or not.

Information entropy S is defined as $S=-\Sigma_i p_i \log_2 p_i$ where $p_i$ is the likelihood of each possible outcome, and it provides a measure of how much information is typically needed to describe a realization from some random phenomena. A high information entropy indicates a random phenomena is challenging to predict and thus takes a large amount of information to describe a realization on average. A low information entropy indicates a random phenomena is easier to predict and thus takes less information to describe a realization on average.

Assuming Eve knows the scenario geometry parameters but does not know Alice's position, Eve would have to guess where to exhibit a false delay in her channel response, but may make an educated guess based on the range of possible delays and the likelihood of Alice's positioning. To quantify how challenging such a guess is for Eve, the information entropy of a scenario's delay distribution may be calculated versus the tolerated delay error $\in$.

For circular ground patch regions, excellent measurement accuracy is generally required to achieve a few bits of information entropy. When the measurement error is large relative to the total range of possible delays, there are few measurable tap delay bins, and it is relatively easy for Eve to guess in which delay bin Bob anticipates a non-zero tap. For example, there is over 60% chance that Alice will exhibit a delay in the range from from 1.25 ns to 3.75 ns with $\in=2.5$ ns. So, it is relatively easy for Eve to guess in which delay bin Bob is anticipating a multipath component, and the information entropy measure is rather low (1.5 bits in this case).

A benefit to Bob despite the apparent challenge of needing to achieve relatively accurate overall delay error is that it seems unlikely that Eve would know the error tolerated in Bob's authentication scheme $\in$. Eve may assume that $\in=W^{-1}$ matching Nyquist sampling criteria (W denotes signal bandwidth), but there are also channel estimation schemes which take advantage of the consistency of channel tap delays from one channel estimate to the next achieving substantially better delay resolution. So, with respect to channel estimation accuracy, there is established evidence that channel estimation schemes can achieve sub nanosecond delay accuracy that Eve may be forced to assume, substantially increasing her perceived burden to deceive Bob. Eve may still assume the burden of defeating a ground-based reflection check from Bob. Under such assumptions, Eve may be deterred from a spoofing attempt if she does not believe she can meet the measurement tolerance she is assuming Bob can achieve.

In addition, with respect to information entropy, when Bob is higher, the probability distribution for the delays flattens out, increasing the information entropy. Geometrically, increasing Bob's height flattens the $\Delta\tau$-isosurfaces making the anticipated delay much more dependent on Alice's reported height than her radial position from Bob. So, error in the reported height of Alice from the geolocation system is amplified when transformed into the delay dimension, and error in the reported radial position is suppressed when transformed into the delay dimension.

With respect to rectangular prism regions of building scenarios, there is a substantial increase in measurement error compared to the measurement error presented for the ground-reflector scenarios. The smallest case error presented for the building reflectors is twice that of the largest case error presented for the ground reflectors. A significant factor enabling meaningful performance with such increased error is the extra distance between Bob and the reflecting plane and that Alice can occupy for building geometries. With a larger $h_{Rx}$ and $h_{ceil}$, there is a larger range of relative delays Alice can exhibit from SBR, and more error can be tolerated to achieve the same information entropy as the ground reflector scenarios. Similar to the ground reflector scenarios, higher information entropy is achieved when Bob is farther from the reflecting plane.

For the geolocation error for the building reflector scenarios, the $\Delta\tau$-isosurfaces in the allowable region tend to be flat and near parallel to the reflecting plane close to the building. This implies that position error in the z-dimension and y-dimension tends to have a smaller impact on the system delay error. Thus, the geolocation system best supports the authentication scheme if it can accurately estimate Alice's position relative to the building. Error in the geolocation system with regards to Alice's height from the ground is suppressed in the $\Delta\tau$ dimension and is less relevant to the authentication scheme.

Figure 13:
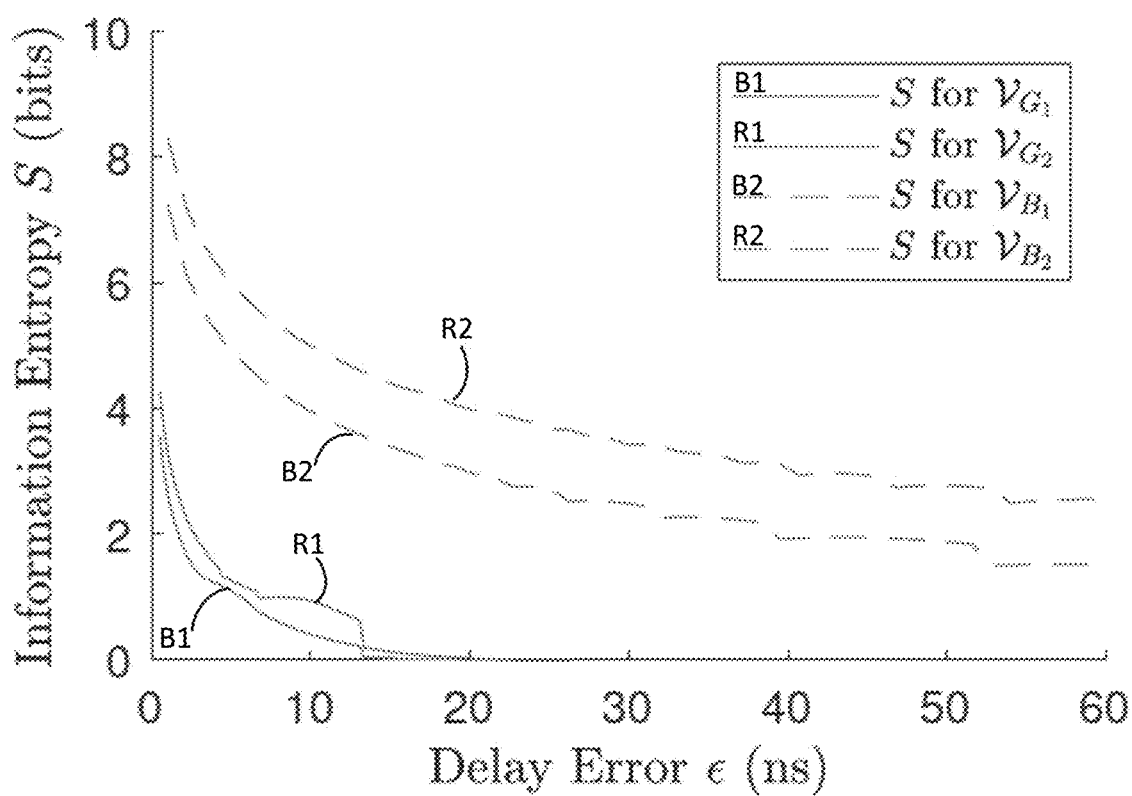
FIG. 13 illustrates information entropy versus delay error for several geometries.

The information entropy S of geometries, of the circular ground patch regions and rectangular prisms, versus delay error E may be visually presented. FIG. 13 illustrates information entropy versus delay error for four geometries. In FIG. 13, the solid lines represent ground reflector geometries and the dashed line represent building reflector geometries. Also in FIGS. 13, B1 and B2 represent conditions where Bob is closer to the reflecting surface, and R1 and R2 represent where Bob is farther away from the reflecting surface. It is clear from FIG. 13 that the building geometries provide higher information entropy than the ground reflector geometries, and that being farther from the reflecting surface tends to increase information entropy, but there is also stair like behavior at larger E on each curve. The stair like behavior in S occurs due to the change in the number of measureable delay bins as E increases. Note that all the information entropy curves eventually go to zero when the delay error E exceeds the maximum delay for the allowable region ($\in\geq\Delta\tau_M^V$). Essentially, at delay errors greater than $\Delta\tau_M^V$, Bob cannot differentiate any relative delays and there is no information required to describe Bob's measured delay; the measured delay is always zero (the LOS component only).

Referring to FIG. 13 again, for very small system delay error, information entropy grows rather rapidly. This implies that highly accurate measurements present a substantial challenge to Eve. It is not surprising that high accuracy measurements of $\Delta\tau$ are difficult to predict and emulate; high accuracy physical measurements represent a common approach to authentication in general. However, actually achieving such high accuracy measurements may be difficult. For context to CIR estimation, CCS for a 400-MHz 5G-NR signal yields channel taps spaced at approximately 2.5 ns, and the delay locked loop approach achieves delay error with a standard deviation of 0.8 ns. Thus, provided adequate measurement accuracy that is achievable with CIR estimation, several bits of information entropy are possible regarding the use of $\Delta\tau$ for authentication in reasonable scenarios. As such, it is unlikely Eve can simply guess the anticipated delay without knowledge of Alice's position in addition to the knowledge of Bob's position and the leveraged planar reflectors.

To determine how likely Eve is to exhibit the anticipated delay by chance, an examination may be performed on two sources that can produce a multipath delay that can deceive Bob in the authentication scheme described herein: random scatterers and reflection from the planar surface P. Bob can only tell if zero or more than zero multipath components arrived in a delay bin. As such, Eve could deceive Bob if a random scatterer causes a multipath delay in the anticipated delay bin or if SBR from Eve off the planar reflecting patch causes a multipath path delay in the anticipated delay bin. It is possible then to quantify how likely it is Eve will inadvertently exhibit a relative delay that is within $\in/2$ of the anticipated delay measurement $\Delta\hat\tau$ to establish an expected miss rate for a given scenario geometry and system delay error. The likelihood that the number of scatterers $N_S$ occurring in a given time interval is one or more is $P(N_S \geq 1) = 1 - e^{-\lambda \Delta\tau}$ where $\lambda$ is the scatter arrival rate and $\Delta\tau$ is the duration of the given time interval. The probability of missing a masquerading attempt by Eve because a random scatter yields a multipath component in the anticipated delay interval $\Delta\hat\tau \pm \in/2$ is $$p_S = 1 - e^{-\lambda \in} \quad (41)$$

where the time interval is the system delay error $\in$. This model assumes the appearance of random scatterers is independent of scenario geometry, Alice's position, and Eve's position. Additionally, because of the assumption that $\in$ is the same for each observable delay interval, the likelihood of a random scatter is constant for each delay interval.

Besides random scatterers, it is reasonable that Eve may be positioned such that she exhibits SBR off the same reflecting patch as Alice. Eve's allowable regions may be characterized with the same scenario parameters as those presented for Alice, but with a higher ceiling to provide a larger volume for covert deployment (e.g., $h_{ceil}=10$ for Eve versus $h_{ceil}=2$ for Alice for ground reflection). The likelihood $p_i^E$ that Eve's relatively delay $\Delta\tau_E$ will occur in a given delay interval is as follows $$p_i^E = \Delta\hat\tau - \epsilon/2 \leq \Delta\tau_E < \Delta\hat\tau + \epsilon/2 = \frac{V_E^+\left(\Delta\hat\tau \frac{\epsilon}{2}\right) - V_E^+\left(\Delta\hat\tau + \frac{\epsilon}{2}\right)}{|V^E|} \quad (42)$$

where $V^E$ is the allowable region for Eve. Thus, $p_i^E$ is the probability that Eve will exhibit a delay in the $i^{th}$ observable delay interval for a given geometry. The probability Bob does not detect a spoofing event $\beta_i$ for the $i^{th}$ delay interval may be calculated $$\beta_i = p_s + p_i^E - p_s p_i^E, i \neq 0 \quad (43)$$

where i is the index of the measureable delays from Alice's allowable region, not Eve's allowable region. Eve's allowable region is larger than Alice's allowable region, thus Eve has a larger range of relative delays she can exhibit from SBR off P. However, we are interested in the likelihood Eve's SBR falls in the delay bin Bob is anticipating from Alice. As such, we use Alice's indexing and ignore indices of delay bins that Eve can potentially exhibit but are outside the range Alice can exhibit. The result from equation 43 is that each measurable delay bin for the allowable region of Alice has a distinct miss rate $\beta_i$.

A rather distinct delay interval where the miss rate does not follow equation 43 is the LOS delay interval $\beta_0$. Because the LOS multipath component is the time reference, there is always a multipath component detected in the time interval $[0, \in/2)$. If Alice's position yields $\Delta\tau_A < \in/2$, then Bob will not be able to differentiate Alice from Eve because Eve will always effectively exhibit a LOS component as well (the first received multipath component is assumed to be the LOS component). The effect of this is that when Alice's position is such that $\Delta\tau_A \in [0, \in/2)$, Eve will always be successful at spoofing $\beta_0 = 1$. This is tolerable as it is only one delay bin that is only half the duration compared to the measurable delay bins, but is needed for the miss rate analysis.

The expected miss rate $\beta$ over all possible delays from Alice may be determined as follows $$\beta = \Sigma_i p_i \beta_i. \quad (44)$$

The expected miss rate provides a metric for the entire scenario geometry. It quantifies on average how likely it is Eve will exhibit a relative delay that falls in the appropriate delay interval to deceive Bob. Thus, the expected miss rate $\beta$ accounts for the chance a random scatter or Eve's reflection off P will yield a delay close enough to that anticipated delay for a successful spoofing attempt.

Figure 14:
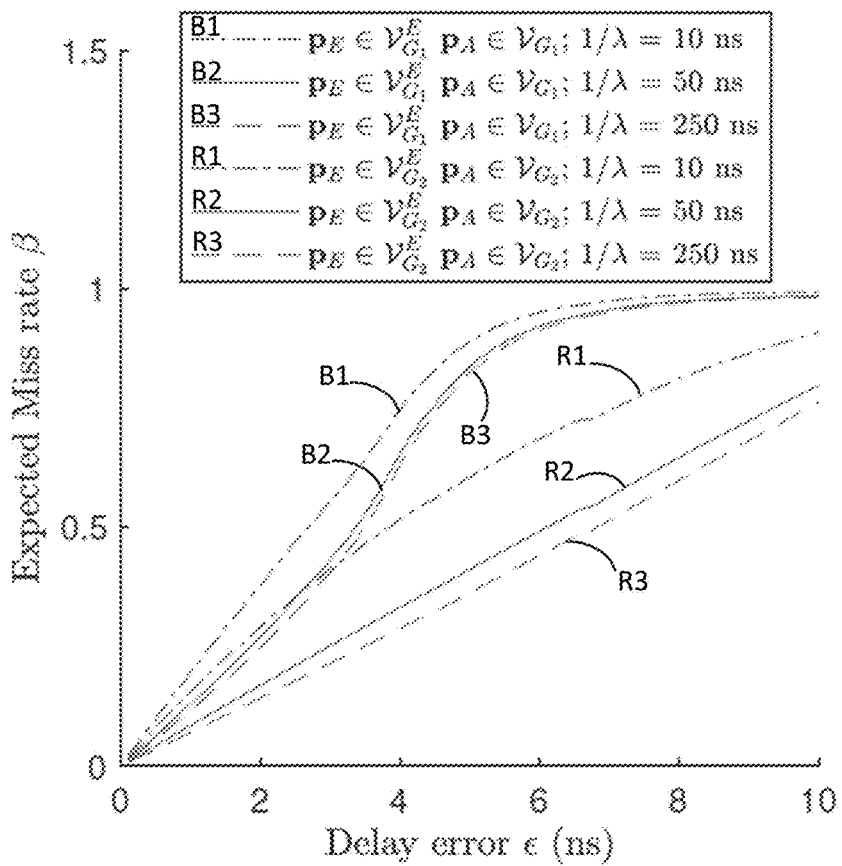
FIG. 14 illustrates the expected miss rate versus delay error for circular ground reflector geometries.
Figure 15:
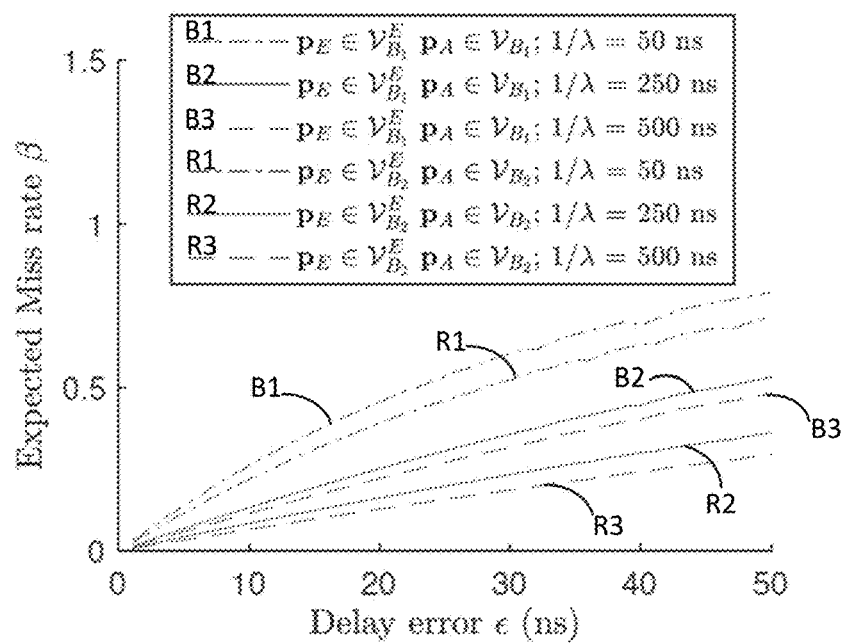
FIG. 15 illustrates the expected miss rate versus delay error for rectangular building geometries.

FIG. 14 illustrates the expected miss rate versus delay error for circular ground reflector geometries ($V_{G_1}$ and $V_{G_2}$). FIG. 15 illustrates the expected miss rate versus delay error for rectangular building geometries ($V_{B_1}$ and $V_{B_2}$). Additionally, for each geometry, the expected miss rate is plotted for various random scatter arrival rates, which are represented as $$\frac{1}{\lambda},$$

representing on average how long the time interval is between random scatterers. For example, if $$\frac{1}{\lambda} = 50 \text{ ns},$$

then on average there is one random scatter every 50 ns.

As seen in FIGS. 14 and 15, as system delay error increases the expected miss rate increases. This is expected as the more measurement error Bob tolerates the more likely it is a multipath component in Eve's channel response will occur in the appropriate delay bin. In addition, some step like behavior is visible at higher $\in$. The step like behavior is the result of the number of resolvable delay bins changing as $\in$ increases, similar to the step like behavior in information entropy illustrated in FIG. 13. However, this step like behavior occurs at rather large expected miss rates. Such large expected miss rates make the authentication scheme rather irrelevant, and it is not expected that the authentication scheme be leveraged in such an operating regime.

Regarding the expected miss rate for building reflector geometries in FIG. 15, substantially more delay error can be tolerated compared to the ground reflector geometries. Again, this is principally driven by the larger range of $\Delta\tau$ values Alice can exhibit in her allowable region for the building scenarios. Also, for the building reflector geometries, the random scatterer densities are lower overall:

$$\frac{1}{\lambda} = 50 \text{ ns},$$

250 ns, and 500 ns rather than 10 ns, 50 ns, and 250 ns for the ground reflector geometries. This is because the expected miss rate β becomes dominated by the random scatterer density λ at large delay error ∈. Essentially, a random scatterer almost always occurs in the anticipated delay interval. If the delay error is bigger than the average time between scatterers $$\epsilon > \frac{1}{\lambda},$$

then the likelihood a random scatter occurs in any delay interval is high $p_s$>0.63. At which point $p_s$ tends to be the largest term in equation 44. This is where the channel sparsity exhibited at millimeter-wave frequencies is an advantage for the authentication scheme described herein, rather than a challenge. Because there are relatively few multipath components in the channel response, Bob is not overwhelmed with random scatters enabling the authentication scheme to achieve useful miss rates.

The determination of an acceptable miss rate β is dependent on the context of employing a physical-layer authentication scheme in a real scenario; however, there are some features with the authentication scheme described herein by which it may be reasonable to accept higher miss rates than are tolerable for other physical-layer authentication schemes. As noted, the second authentication scheme is independent of cryptography-based authentication and acts as an additional factor by which to authenticate, thereby enabling multi-factor authentication for Alice. If multiple delays are anticipated from multiple reflectors, then each presents an additional factor by which to authenticate Alice. Thus, it is reasonable multiple planar reflections may be available, enabling larger expected miss rates for each applicable allowable region. An additional benefit of the authentication scheme regards the system alerting a security monitor that a masquerading attempt occurred. Because the monitor is presented that the multipath component from reflection off a particular structure did not occur, the monitor can immediately investigate whether some obstruction blocked the transmission path. Association to an environmental structure empowers security personnel to assess the detected violation with typical security measures such as cameras and guards. Finally, if Alice is cooperative, then Bob can have her change positions to optimal locations for system authentication if her current position yields inadequate assurance. Because the authentication scheme described herein is based on a clear cause-effect relationship with the environment, it may be reasonable to accept worse expected miss rates because the security system as a whole can leverage complimentary security mechanisms. Other physical-layer authentication schemes tend to be black box in nature (some feature vector previously associated to Alice changed too much and alarm was triggered). Integration of such schemes with existing security tools such as cameras and guards can be challenging as there is no location information to tip off to the security personnel.

This description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention.

What is claimed is:

1. A method of physical layer authentication, comprising:
   receiving a transmission by a transmitter at a receiver over a sparse wireless channel, the transmitter being located in a region that comprises a mapped planar reflector having a reflecting plane suitable for generating a specular reflection;
   estimating a time-domain channel response measurement for the transmission;
   based on the channel response measurement, determining whether a non-zero tap is detected within an anticipated delay interval of an anticipated relative time delay, the anticipated relative time delay being based on a position of the transmitter and a position of the mapped planar reflector;
   upon determining that a non-zero tap is detected within the delay interval, declaring the transmission as authentic; and
   wherein the delay interval comprises a lower bound that is less than the anticipated relative time delay and an upper bound that is larger than the anticipated relative time delay; and
   wherein the delay interval is based on a delay error related to a desired security metric.

2. The method of claim 1, further comprising:
   upon determining that no non-zero tap is detected within the interval, declaring the transmission as inauthentic.

3. The method of claim 1, wherein the security metric is at least one of a miss rate or information entropy.

4. The method of claim 1, wherein the channel response measurement comprises a delay line with multiple taps having tap power levels represented as discrete impulses at different delay intervals, the delay line comprising a first tap associated with a line-of-sight multipath component and a second tap associated with the reflected multipath component.

5. The method of claim 4, wherein the first tap occurs at a first delay interval and the second tap occurs at a second delay interval, the second delay interval being greater than the first delay interval.

6. The method of claim 4, wherein the line-of-sight multipath component is associated with a direct transmission path between the transmitter and the receiver, and the reflected multipath component is associated with an indirect transmission path between the transmitter and the receiver that includes a bounce off of the reflecting plane.

7. The method of claim 1, further comprising:
   prior to receiving the transmission,
      receiving location data of the transmitter, the location data indicating a position of the transmitter; and
      receiving a map of planar reflectors within the region, the map comprising at least one of location, orientation or physical extent information of the planar reflectors.

8. The method of claim 1, further comprising:
   prior to receiving the transmission, receiving the anticipated relative time delay, the anticipated relative time delay comprising a time difference between a first time delay of a line-of-sight multipath component and a second time delay of a reflected multipath component.

9. A system for physical layer authentication, comprising:
a receiving subsystem configured to receive a transmission by a transmitter over a sparse wireless channel, the transmitter being in a region that comprises a mapped planar reflector having a reflecting plane suitable for generating a specular reflection;
a channel estimation subsystem configured to estimate a time-domain channel response measurement for the transmission;
an authenticator configured to determine whether a non-zero tap is detected within an anticipated delay interval of an anticipated relative time delay, the anticipated relative time delay being based on a position of the transmitter and a position of the mapped planar reflector, and declare the transmission as authentic upon determining that a non-zero tap is detected within the delay interval; and
wherein the delay interval comprises a lower bound that is less than the anticipated relative time delay and an upper bound that is larger than the anticipated relative time delay; and
wherein the delay interval is based on a delay error related to a desired security metric.

10. The system of claim 9, further comprising:
a geolocation service configured to determine location data of the transmitter, the location data indicating the position of the transmitter; and
a surveying subsystem configured to generate a map of planar reflectors within the region, the map comprising at least one of location, orientation and physical extent information of the planar reflectors.

11. The system of claim 10, wherein the surveying subsystem is further configured to determine the anticipated relative time delay as being a time difference between a first time delay of a line-of-sight multipath component and a second time delay of a reflected multipath component.

12. The system of claim 9, wherein the authenticator is further configured to declare the transmission as inauthentic upon determining that no non-zero tap is detected within the interval.

13. The system of claim 9, wherein the channel estimation subsystem is configured to estimate the time-domain channel response by generating a delay line with multiple taps having tap power levels represented as discrete impulses at different delay intervals, the delay line comprising a first tap associated with a line-of-sight multipath component and a second tap associated with the reflected multipath component.

14. The system of claim 9, wherein the line-of-sight multipath component is associated with a direct transmission path between the transmitter and the receiving subsystem, and the reflected multipath component is associated with an indirect transmission path between the transmitter and the receiving subsystem that includes a bounce off of the reflecting plane.

15. A method of physical layer authentication, comprising:
receiving a first transmission from a transmitter via a millimeter-wave channel;
determining a channel response measurement in time domain, the measurement comprising a delay line with multiple taps having tap power levels represented as discrete impulses at different delay intervals;
associating the measurement to the transmitter;
for the associated measurement, assigning a state of occupied or empty to each of the multiple delay intervals;
receiving a second transmission from the transmitter;
checking the state of each of the multiple delay intervals;
determining a first number of delay intervals that remains occupied and a second number of delay intervals that remains empty;
determining that the second transmission is authentic when a sum of the first number and the second number exceeds a predetermined threshold; and
wherein the delay interval comprises a lower bound that is less than the anticipated relative time delay and an upper bound that is larger than the anticipated relative time delay; and
wherein the delay interval is based on a delay error related to a desired security metric.

16. The method of claim 15, further comprising determining that the second transmission is inauthentic when the sum the first number and the second number is below the predetermined threshold.

17. The method of claim 15, wherein the threshold is based on a desired false alarm rate that represents a likelihood that the second transmission is falsely determined to be inauthentic.

18. The method of claim 15, wherein the threshold is based on a desired miss rate that represents a likelihood that the second transmission is falsely determined to be authentic.

* * * * *